(12) United States Patent
Tamano et al.

(10) Patent No.: US 10,642,012 B2
(45) Date of Patent: May 5, 2020

(54) LASER SCANNING MICROSCOPE, AND LASER SCANNING MICROSCOPE CONTROL METHOD

(71) Applicant: OLYMPUS CORPORATION, Hachioji-shi, Tokyo (JP)

(72) Inventors: Shingo Tamano, Tokyo (JP); Kazuhiko Hosono, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/608,401

(22) Filed: May 30, 2017

(65) Prior Publication Data
US 2017/0351074 A1 Dec. 7, 2017

(30) Foreign Application Priority Data

Jun. 6, 2016 (JP) ................... 2016-112953

(51) Int. Cl.
*G02B 21/00* (2006.01)
*G01N 21/64* (2006.01)
(Continued)

(52) U.S. Cl.
CPC ......... *G02B 21/0048* (2013.01); *G01N 21/64* (2013.01); *G01N 21/6458* (2013.01);
(Continued)

(58) Field of Classification Search
CPC ............ G02B 21/0044; G02B 21/0048; G02B 19/0085; G02B 21/0032; G02B 21/0064;
(Continued)

(56) References Cited

U.S. PATENT DOCUMENTS 3,926,500 A * 12/1975 Frosch ................. G02B 21/082
359/235
4,661,692 A * 4/1987 Kawasaki ............ G02B 21/244
250/201.2
(Continued)

FOREIGN PATENT DOCUMENTS

DE 10331907 A1 2/2005
EP 0274155 A1 7/1988
(Continued)

OTHER PUBLICATIONS

Extended European Search Report (EESR) dated Feb. 14, 2018 issued in counterpart European Application No. 17173192.0.
(Continued)

*Primary Examiner* — George G King
(74) *Attorney, Agent, or Firm* — Holtz, Holtz & Volek PC

(57) ABSTRACT

A laser scanning microscope includes: an objective that irradiates a specimen with a laser beam; a detection lens that condenses the laser beam that passes through the specimen, the detection lens being arranged so as to face the objective; an optical element that is removably arranged between an image plane on which the detection lens forms an image of the specimen and a first surface that is a lens surface closest to the specimen of the detection lens, the optical element converting the laser beam made incident on the optical element into diffused light or deflecting a portion of the laser beam made incident on the optical element; and a photodetector that detects detection light emitted from the optical element arranged between the image plane and the first surface to the image plane.

6 Claims, 25 Drawing Sheets

(51) Int. Cl.

| | | |
|---|---|---|
| *G02B 21/36* | (2006.01) | |
| *G02B 19/00* | (2006.01) | |
| *G02B 21/08* | (2006.01) | |
| *G02B 21/16* | (2006.01) | |
| *G02B 5/02* | (2006.01) | |

(52) U.S. Cl.
CPC ..... *G02B 19/0085* (2013.01); *G02B 21/0032* (2013.01); *G02B 21/0064* (2013.01); *G02B 21/0076* (2013.01); *G02B 21/0088* (2013.01); *G02B 21/086* (2013.01); *G02B 21/16* (2013.01); *G01N 2201/06* (2013.01); *G01N 2201/06113* (2013.01); *G02B 5/02* (2013.01); *G02B 21/006* (2013.01); *G02B 21/008* (2013.01); *G02B 21/367* (2013.01)

(58) Field of Classification Search
CPC .... G02B 21/0076; G02B 5/02; G02B 21/006; G02B 21/008; G02B 21/367; G02B 21/0088; G02B 21/086; G02B 21/16; G01N 21/64; G01N 21/6458; G01N 2201/06; G01N 2201/06113
USPC .......................................... 359/380, 381, 388
See application file for complete search history.

(56) References Cited

U.S. PATENT DOCUMENTS

| | | | |
|---|---|---|---|
| 4,845,352 A | 7/1989 | Benschop | |
| 5,065,008 A * | 11/1991 | Hakamata | G02B 21/0032 250/216 |
| 6,212,005 B1 | 4/2001 | Kawasaki et al. | |
| 2008/0266551 A1* | 10/2008 | Araki | G02B 21/0064 356/73 |
| 2015/0185460 A1* | 7/2015 | Nakasho | G02B 21/16 250/459.1 |
| 2016/0054554 A1 | 2/2016 | Tamano | |

FOREIGN PATENT DOCUMENTS

| | | |
|---|---|---|
| EP | 2290423 A1 | 3/2011 |
| JP | 11287955 A | 10/1999 |
| JP | 2001208977 A | 8/2001 |
| JP | 2004325869 A | 11/2004 |
| JP | 2008102294 A | 5/2008 |
| JP | 2008275763 A | 11/2008 |
| JP | 2009128446 A | 6/2009 |
| JP | 2010102264 A | 5/2010 |
| JP | 2016045412 A | 4/2016 |

OTHER PUBLICATIONS

Anonymous, "Customer Magazine for Neuroscience Confocal Fixed Stage System Stereotaxic Atlases for Neuroscience Immunohistochemistry in Research and Diagnosis", Sep. 17, 2009, retrieved from internet: (https://www.leicabiosystems.com/fileadmin/downloads_lbs/Leica%20CM3050%20S/Newsletters/reSOLUTION_Research_Neuroscience_07.pdf>.

Chao, et al., "Programmable aperture microscopy: A computational method for multi-modal phase contrast and light field imaging", Optics and Lasers in Engineering, vol. 80, Jan. 12, 2016, pp. 24-31.

Collings, "Optimisation approaches for concurrent transmitted light imaging during confocal microscopy", Plant Methods, vol. 11, No. 1, Aug. 21, 2015, p. 40.

Nevian, et al., "Calcium dynamics in dendrites and spines of spiny neurons in the somatosensory 'barrel' cortex of the rat", Feb. 27, 2003, retrieved from internet: <http://archiv.ub.uni-heidelberg.de/volltextserver/3249/1/Thesis_Nevian_final.pdf>, pp. 60-61, fig 3.13.

Partial European Search Report dated Oct. 24, 2017 issued in counterpart European Application No. 17173192.0.

Dean, "Micro-Manager User's Guide—Micro—Manager", Apr. 30, 2012.

Wheeler, et al., "Title: Nikon AIR Confocal User Manual Facility Usage Policy", Feb. 25, 2016.

European Office Action dated Dec. 5, 2018 issued in counterpart European Application No. 17173192.0.

Cody, et al., "A Simple Method Allowing DIC Imaging in Conjunction with Confocal Microscopy", Journal of Microscopy, vol. 217, No. 3, pp. 265-274, append "2005" GGK Jan. 4, 2019.

European Office Action dated Jul. 19, 2019 issued in European Application No. 17173192.0.

Amos, et al., "Confocal microscopy", Chapter in: Handbook of Comprehensive Biophysics; Elsevier, 2011.

Japanese Office Action (and English language translation thereof) dated Mar. 10, 2020 issued in Japanese Application No. 2016-112953.

* cited by examiner

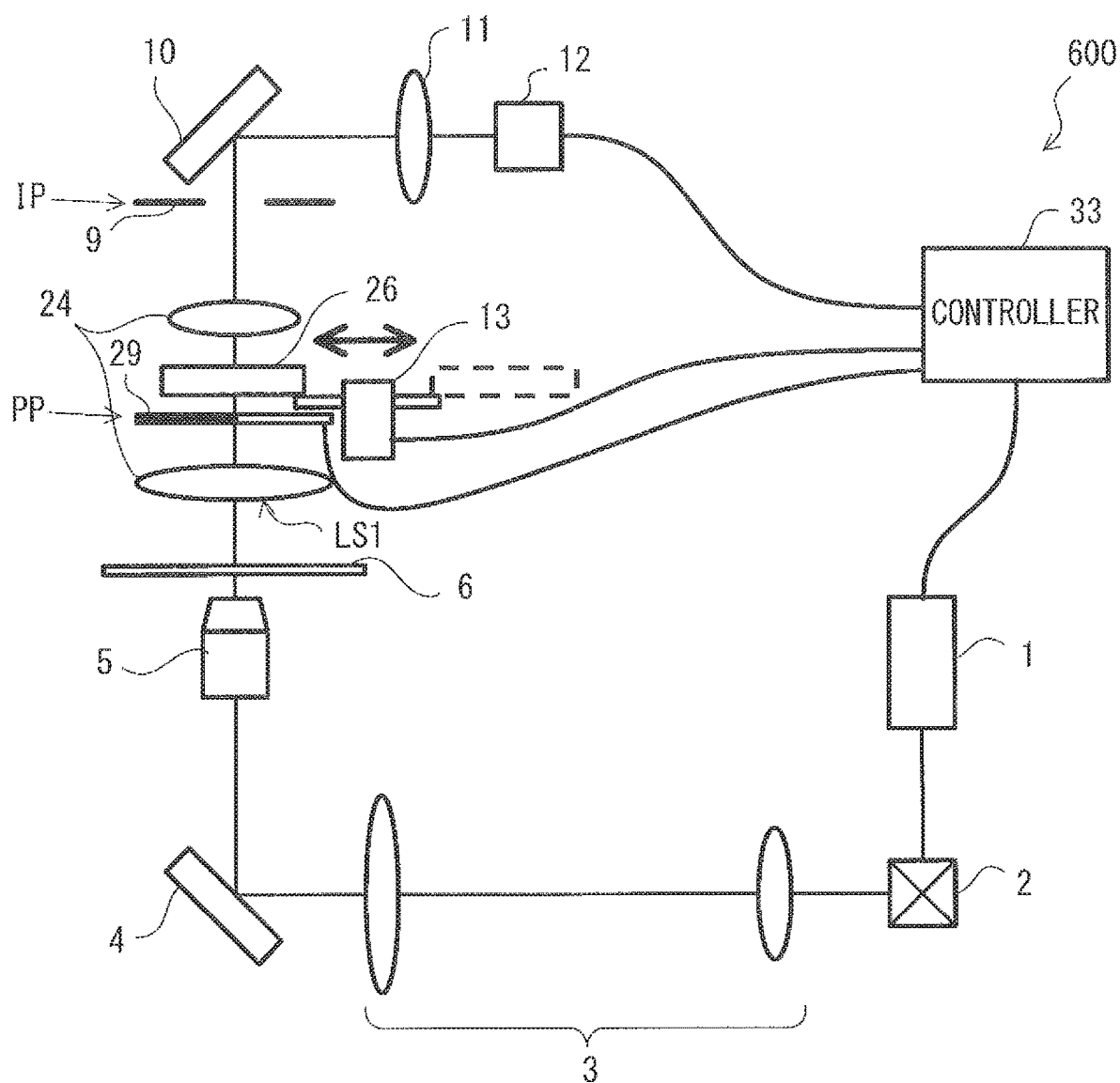
F I G. 17

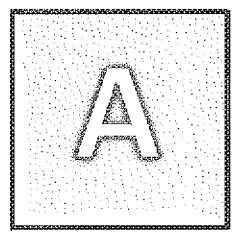
F I G. 2 2

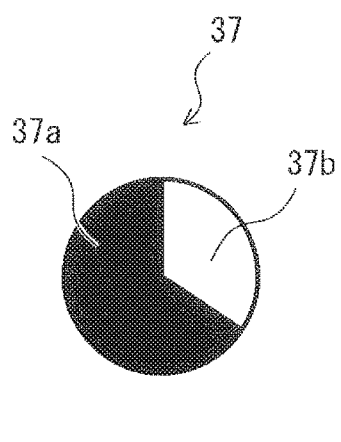 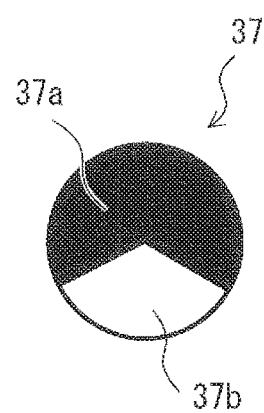 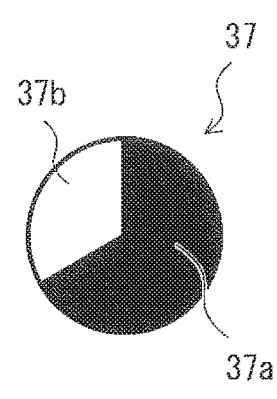
F I G. 2 3 A　　　F I G. 2 3 B　　　F I G. 2 3 C

LASER SCANNING MICROSCOPE, AND LASER SCANNING MICROSCOPE CONTROL METHOD

CROSS REFERENCE TO RELATED APPLICATIONS

This application is based upon and claims the benefit of priority from prior Japanese Patent Application No. 2016-112953, filed Jun. 6, 2016, the entire contents of which are incorporated herein by this reference.

BACKGROUND OF THE INVENTION

Field of the Invention

Disclosure of the present invention relates to a laser scanning microscope, and a laser scanning microscope control method.

Description of the Related Art

Conventionally, a laser scanning microscope is known, for example, that includes a detection lens that faces an objective with a biological specimen interposed between the detection lens and the objective, and a photodetector that detects light that passes through the biological specimen and is condensed by the detection lens (see Japanese Laid-Open Patent Publication No. 2010-102264).

By employing the laser scanning microscope above, a transmission image that enables the shape of a cell in the biological specimen to be grasped, in addition to a fluorescence image, can be obtained by scanning the biological specimen once. In addition, vital phenomena that occur in the cell can be observed better by displaying the fluorescence image over the transmission image.

SUMMARY OF THE INVENTION

A laser scanning microscope in one aspect of the present invention includes: an objective that irradiates a specimen with a laser beam; a detection lens that condenses the laser beam that passes through the specimen, the detection lens being arranged so as to face the objective with the specimen interposed between the detection lens and the objective; an optical element that is removably arranged between an image plane on which the detection lens forms an image of the specimen and a first surface that is a lens surface closest to the specimen of the detection lens, the optical element converting the laser beam made incident on the optical element into diffused light or deflecting a portion of the laser beam made incident on the optical element; and a photodetector that detects detection light emitted from the optical element arranged between the image plane and the first surface to the image plane.

A laser scanning microscope in another aspect of the present invention includes: a condenser lens that condenses a laser beam that passes through a specimen; an optical element that is removably arranged between an image plane on which the condenser lens forms an image of the specimen and a first surface that is a lens surface closest to the specimen of the condenser lens, the optical element converting the laser beam made incident on the optical element into diffused light or deflecting a portion of the laser beam made incident on the optical element; and a photodetector that detects detection light emitted from the optical element arranged between the image plane and the first surface to the image plane.

A control method of a laser scanning microscope in another aspect of the present invention includes: controlling insertion or removal of an optical element between an image plane on which a detection lens forms an image of a specimen and a first surface that is a lens surface closest to the specimen of the detection lens in accordance with a magnification of an objective that irradiates the specimen with a laser beam, the optical element converting the laser beam into diffused light or deflecting a portion of the laser beam, the detection lens being arranged so as to face the objective with the specimen interposed between the detection lens and the objective; and controlling at least one of an amplification factor of a photodetector and an output of a laser light source in accordance with the insertion or removal of the optical element, the photodetector detecting detection light emitted from the optical element to the image plane, the laser light source emitting the laser beam.

BRIEF DESCRIPTION OF THE DRAWINGS

The present invention will be more apparent from the following detailed description when the accompanying drawings are referenced.

FIG. 17 illustrates the configuration of a laser scanning microscope 600 according to a sixth embodiment.

FIG. 22 illustrates an image 36 that is newly generated from the image 34 of FIG. 19 and the image 35 of FIG. 21.

FIG. 23A to FIG. 23C illustrate a light shielding member 37.

DESCRIPTION OF THE EMBODIMENTS

In recent years, microscopes have been requested to be capable of observing interactions between cells in addition to phenomena within a cell. Accordingly, laser scanning microscopes have been requested to cope with a wider magnification range than before, and in particular, a wide magnification range including a very low magnification that is lower than 10 times.

Generally, in laser scanning microscopes, a fluorescence image can be obtained within a wide magnification range by switching and using objectives having magnifications different from each other. In addition, a transmission image can also be obtained within a wide magnification range by switching detection lenses according to the magnification of the objective.

In consideration of work burdens on a user, a cost, and the like, it is desirable that the same detection lens be used within a wide magnification range without switching detection lenses, when transmission images are obtained. Accordingly, a laser scanning microscope that uses a detection lens having a relatively large lens diameter within a wide magnification range in order to suppress vignetting of off-axis light in the detection lens, a laser scanning microscope that includes an auxiliary lens that can be inserted or removed on an object side of a detection lens, and the like have been proposed.

However, when a detection lens is attempted to cope with observation at a very low magnification, the lens diameter of the detection lens greatly increases. In addition, even when the lens diameter of the detection lens increases, there is a limit to suppression of vignetting that is generated on a side closer to a photodetector than the detection lens. Accordingly, it is difficult to widen a magnification range to a lower magnification than before only by increasing the lens diameter of the detection lens. Further, in a configuration in which an auxiliary lens is inserted or removed on an object side of the detection lens, a space into which the auxiliary lens is inserted is required. Therefore, a space in which a biological specimen is arranged is reduced, and this results in restriction in the size of the biological specimen. Furthermore, the efficiency of various tasks performed on a stage is reduced.

First Embodiment

Figure 1:
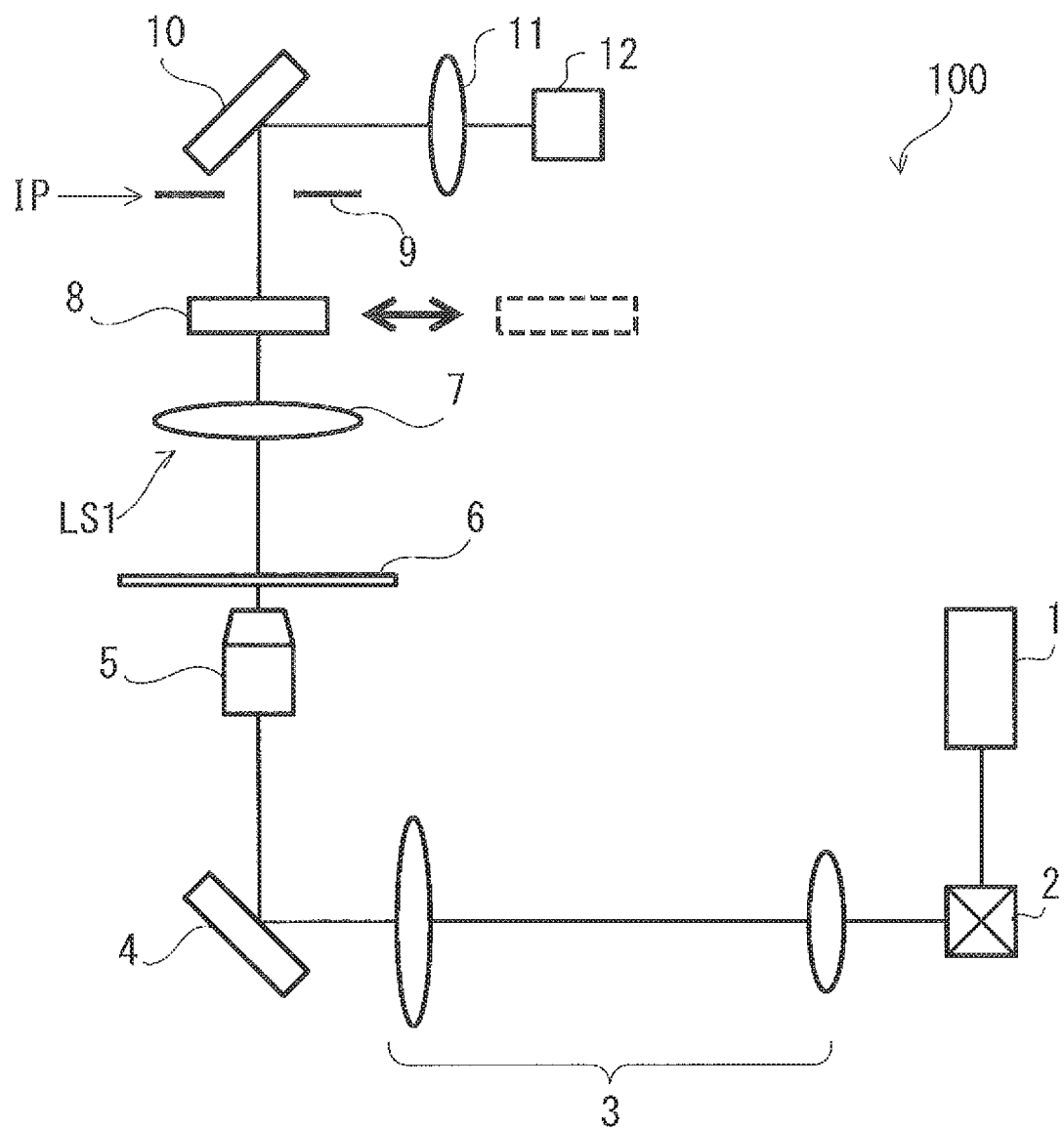
FIG. 1 illustrates the configuration of a laser scanning microscope 100 according to a first embodiment.
Figure 2:
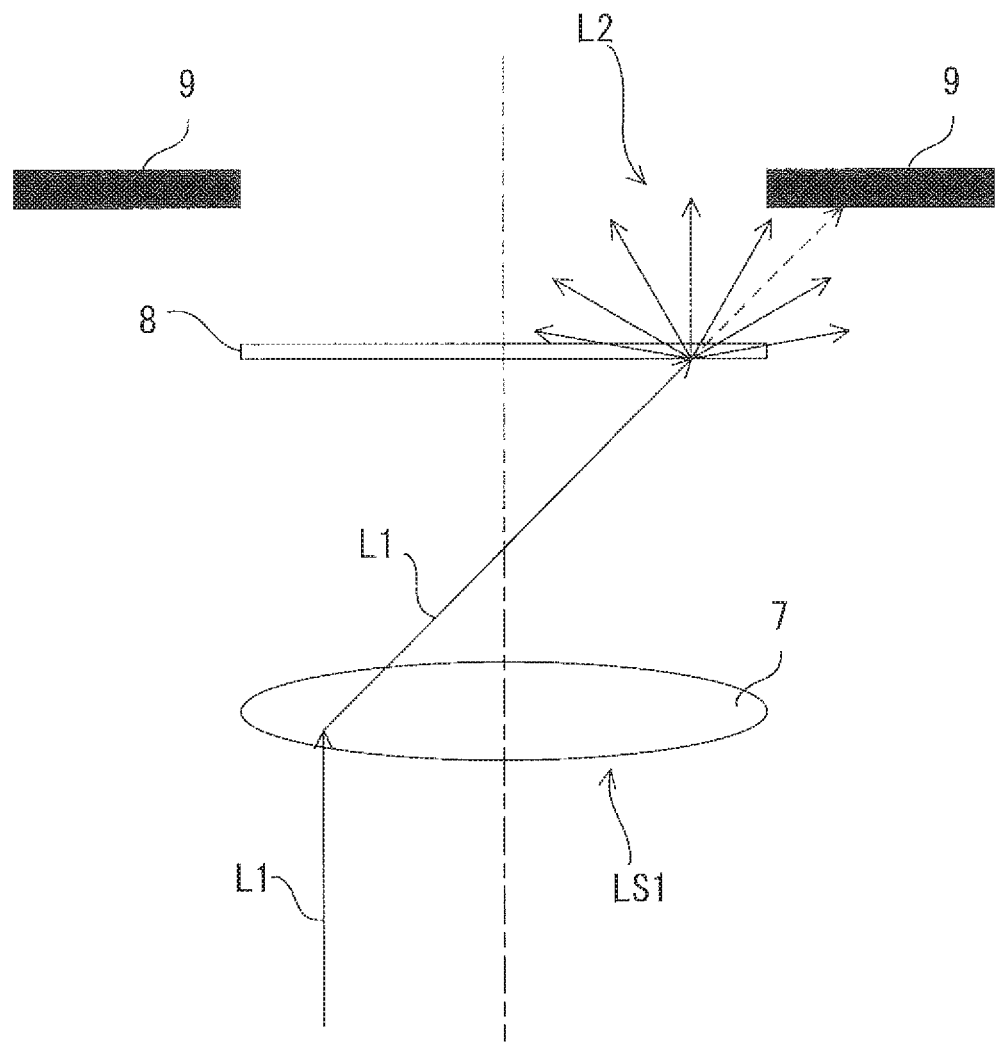
FIG. 2 is a diagram explaining an action of an optical element 8.

FIG. 1 illustrates the configuration of a laser scanning microscope 100 according to this embodiment. FIG. 2 is a diagram explaining an action of an optical element 8 included in the laser scanning microscope 100. This embodiment is described below by using a case in which the laser scanning microscope 100 is used to observe a biological specimen as an example.

The laser scanning microscope 100 includes a laser 1 that emits a laser beam. The laser scanning microscope 100 further includes a scanner 2, a relay optical system 3, a mirror 4, and an objective 5 on an illumination light path from the laser 1 to a stage 6.

The laser 1 is a laser light source that emits a laser beam that excites a specimen. The scanner 2 is a two-dimensional scanner that scans a specimen arranged on the stage 6 in a direction orthogonal to an optical axis of the objective 5 by changing a direction in which the laser beam is deflected. The scanner 2 includes, for example, a resonant scanner and a galvanometer mirror. The relay optical system 3 is an optical system that projects an image of the scanner 2 in or near a pupil position of the objective 5. The objective 5 is an infinity-corrected objective, and the objective 5 irradiates the specimen arranged on the stage 6 with a laser beam. In the laser scanning microscope 100, objectives having various magnifications are switched and used by using a not-illustrated revolver or the like.

The laser scanning microscope 100 includes a photodetector 12 for transmission detection. The laser scanning microscope 100 further includes a detection lens 7, an optical element 8, a field stop 9, a mirror 10, and a relay optical system 11 on an optical path from the stage 6 to the photodetector 12.

Both the mirror 4 and the mirror 10 described above may be dichroic mirrors, or may be half mirrors. In these cases, another detection optical system and another illumination optical system can be arranged respectively on transmitted light paths of the mirror 4 and the mirror 10 along an optical-axis direction of the objective 5.

The detection lens 7 is a lens that condenses a laser beam that has passed through the specimen, and the detection lens 7 is arranged so as to face the objective 5 with the stage 6 (or the specimen arranged on the stage 6) interposed between the detection lens 7 and the objective 5. The optical element 8 is a light diffusion element that converts a laser beam made incident on the optical element 8 into diffused light, and the optical element 8 is a light diffusion plate in this example. The optical element 8 is removably arranged between an image plane IP on which the detection lens 7 forms an image of the specimen and a first surface LS1 that is a lens surface closest to the specimen of the detection lens 7.

The field stop 9 is provided on the image plane IP that is optically conjugate to a specimen surface (a surface of the stage 6). The relay optical system 11 is a relay optical system that projects an exit pupil of the detection lens 7 onto the photodetector 12, and the relay optical system 11 is arranged between the optical element 8 that is arranged between the image plane IP and the first surface LS1, and the photodetector 12. The photodetector 12 is a photodetector that outputs a signal according to an intensity of a detected laser beam, and the photodetector 12 is, for example, a photomultiplier tube (PMT).

In the laser scanning microscope 100 that is configured as described above, a position in which the laser beam is applied to the specimen changes according to a direction in which the scanner 2 deflects the laser beam. The laser beam that has passed through the specimen enters the photodetector 12 regardless of an irradiation position, unless vignetting is generated on the optical path. Accordingly, a scanning image of the specimen can be obtained by obtaining luminance data according to a signal that is output from the photodetector 12 in each of the irradiation positions of the laser beam, and two-dimensionally mapping respective pieces of luminance data according to the irradiation positions. This scanning image is an image obtained by detecting light that has passed through the specimen, and therefore the scanning image is also referred to as a transmission image.

Meanwhile, in the laser scanning microscope 100, as the laser beam condensed by the detection lens 7 moves farther away from an exit pupil position of the detection lens 7 after having passed through the exit pupil position, the laser beam further deviates from the optical axis. This tendency becomes remarkable because, as a lower-magnification objective having a wider illumination range (field of view) is used, a laser beam from a position away from the optical axis on the specimen passes through the exit pupil position at a sharper angle. Accordingly, when the magnification of an objective to be used is reduced (for example, when the magnification becomes lower than or equal to a certain magnification), vignetting is generated in a configuration located at a rear stage of the detection lens 7 (for example, the field stop 9 or the relay optical system 11). Therefore, a transmission image is likely to be dark in a peripheral portion of a field of view.

Accordingly, in the laser scanning microscope 100, a user inserts or removes the optical element 8 between the first surface LS1 and the image plane IP in accordance with a situation. Typically, when the magnification of an objective to be used is low, the optical element 8 is arranged on the optical path. When the transmission image is dark in the peripheral portion of the field of view, the optical element 8 may be arranged on the optical path.

Consequently, as illustrated in FIG. 2, light L1 from the peripheral portion of the field of view that is shielded by the field stop 9 if the optical element 8 is not inserted on the optical path is converted into diffused light L2 by the optical element 8, and a portion of the diffused light L2 passes through the field stop 9. Therefore, deficiency in a peripheral light amount can be suppressed. When the magnification of an objective to be used is high, the optical element 8 is arranged outside the optical path. Consequently, an amount of detection light can be prevented from decreasing due to unnecessary diffusion in the optical element 8.

Accordingly, by employing the laser scanning microscope 100, a transmission image can be obtained within a wide magnification range without switching detection lenses by inserting or removing the optical element 8 into/from the optical path as needed. A transmission image can be obtained within a wide magnification range without sacrificing a space in which a specimen is arranged, in particular, by inserting or removing the optical element 8 between the first surface LS1 and the image plane IP.

The laser scanning microscope 100 may include an optical system and a photodetector for detecting fluorescence that is emitted from the specimen to the objective 5 due to irradiation with a laser beam, but this is not illustrated in FIG. 1. In this case, a dichroic mirror is used, for example, as the mirror 4. Consequently, the laser scanning microscope 100 can obtain a fluorescence image in addition to a transmission image by performing one scanning.

In addition, the laser scanning microscope 100 may include an illumination unit that illuminates the specimen from a side of the detection lens 7, but this is not illustrated in FIG. 1. In this case, the detection lens 7 may be a condenser lens, and the field stop 9 is used to restrict an illumination range. In addition, a half mirror is used, for example, as the mirror 10.

An example in which the photodetector 12 detects a laser beam has been described above, but light detected by the photodetector 12 is not limited to the laser beam. The optical element 8 may be any light diffusion element that converts a laser beam made incident on the optical element 8 into diffused light. Therefore, the optical element 8 may be, for example, a fluorescent plate that emits fluorescence upon incidence of a laser beam, or may be an upconversion light-emitting element that emits light having a wavelength shorter than the wavelength of a laser beam upon incidence of the laser beam. Namely, the optical element 8 may be an optical element that converts a laser beam into light having a different wavelength and emits the light, and the photodetector 12 may detect light that is emitted from the optical element 8 to the image plane IP (hereinafter referred to as detection light). The detection light may be a laser beam, light having a wavelength longer than the wavelength of the laser beam, or light having a wavelength shorter than the wavelength of the laser beam.

Second Embodiment

Figure 3:
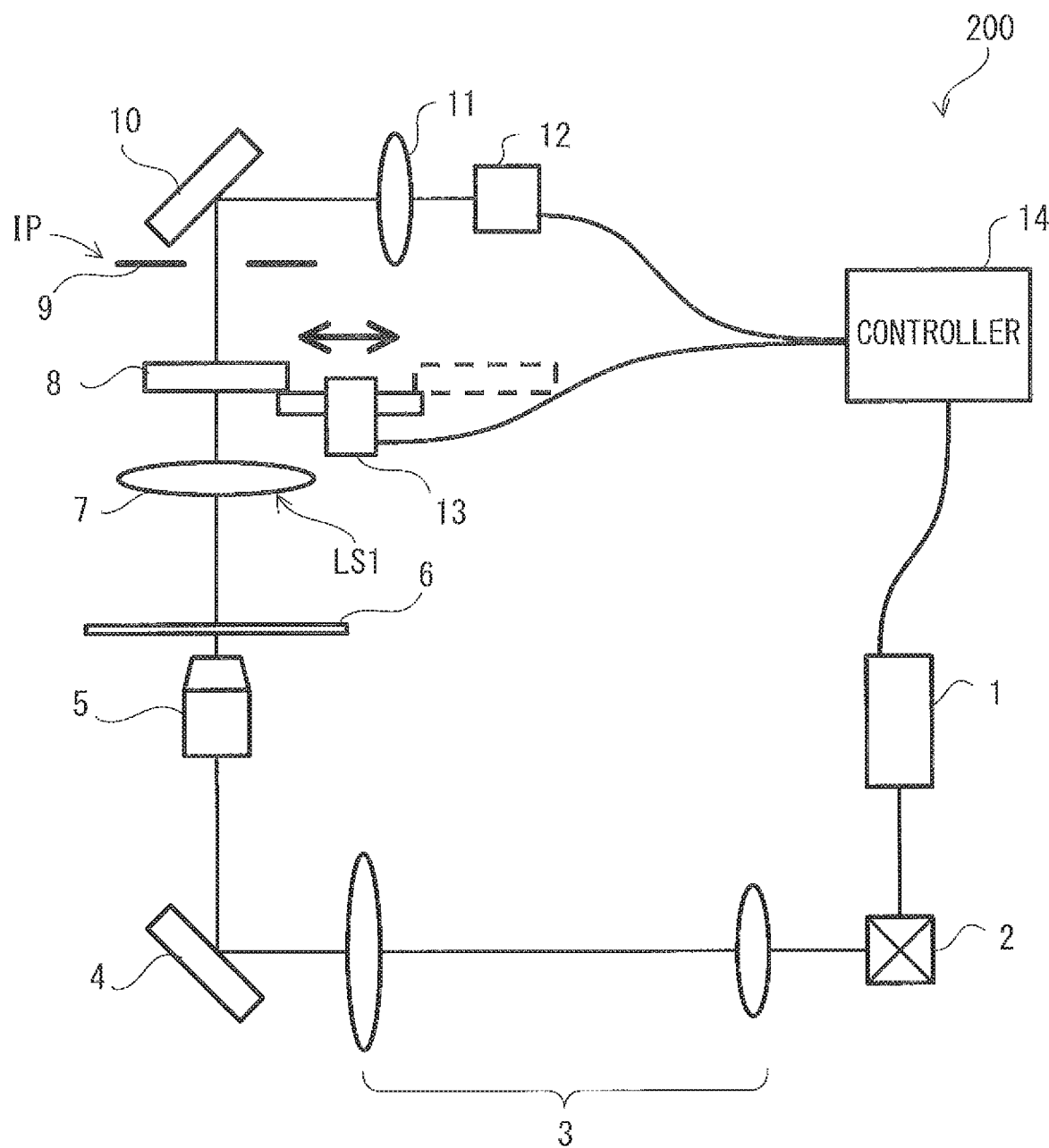
FIG. 3 illustrates the configuration of a laser scanning microscope 200 according to a second embodiment.

FIG. 3 illustrates the configuration of a laser scanning microscope 200 according to this embodiment. The laser scanning microscope 200 is different from the laser scanning microscope 100 in that the laser scanning microscope 200 includes a turret 13 that inserts or removes the optical element 8 into/from the optical path and a controller 14 that is connected to the laser 1, the photodetector 12, and the turret 13. In the other respects, the laser scanning microscope 200 is similar to the laser scanning microscope 100. The turret 13 is an electric turret that is rotationally driven according to an instruction from the controller 14. The controller 14 is configured to control at least one of an amplification factor of the photodetector 12 and an output of the laser 1 in accordance with insertion or removal of the optical element 8 into/from the optical path. In addition, the controller 14 is configured to control insertion or removal of the optical element 8 into/from the optical path.

FIG. 3 illustrates the turret 13 as a mechanism that inserts or removes the optical element 8 into/from the optical path, but the mechanism that inserts or removes the optical element 8 into/from the optical path is not particularly limited, and an arbitrary mechanism can be employed. As an example, a drive mechanism that slidably inserts or removes the optical element 8 may be employed instead of the turret 13.

Figure 4:
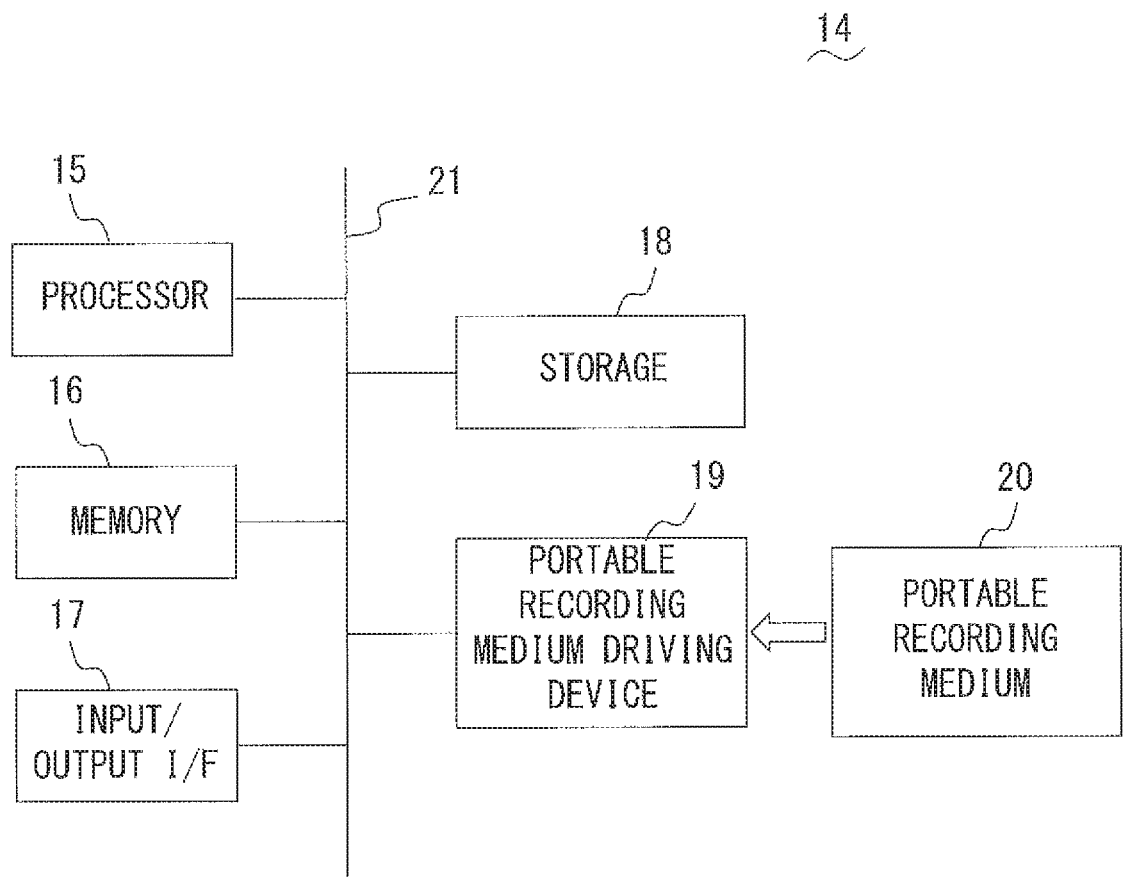
FIG. 4 illustrates the configuration of hardware of a controller 14.

FIG. 4 illustrates the configuration of hardware of the controller 14. The controller 14 is, for example, a standard computer. The controller 14 includes a processor 15, a memory 16, an input/output interface 17, a storage 18, and a portable recording medium driving device 19 that a portable recording medium 20 is inserted into, and these components are mutually connected by a bus 21. The configuration of FIG. 4 is an example of a hardware configuration of the controller 14, and the controller 14 is not limited to this configuration.

The processor 15 is, for example, a central processing unit (CPU), a micro processing unit (MPU), a digital signal processor (DSP), or the like, and the processor 15 executes a program, and performs programmed processing. The memory 16 is, for example, a random access memory (RAM), and the memory 16 temporarily stores a program or data recorded in the storage 18 or the portable recording medium 20.

The input/output interface 17 is a circuit that transmits or receives a signal to/from devices other than the controller 14 (for example, the laser 1, the photodetector 12, the turret 13, and the like). The storage 18 is, for example, a hard disk or a flash memory, and the storage 18 is principally used to record various types of data or programs. The portable recording medium driving device 19 accommodates the portable recording medium 20 such as an optical disk or a CompactFlash (registered trademark). The portable recording medium 20 has a role of assisting the storage 18.

Figure 5:
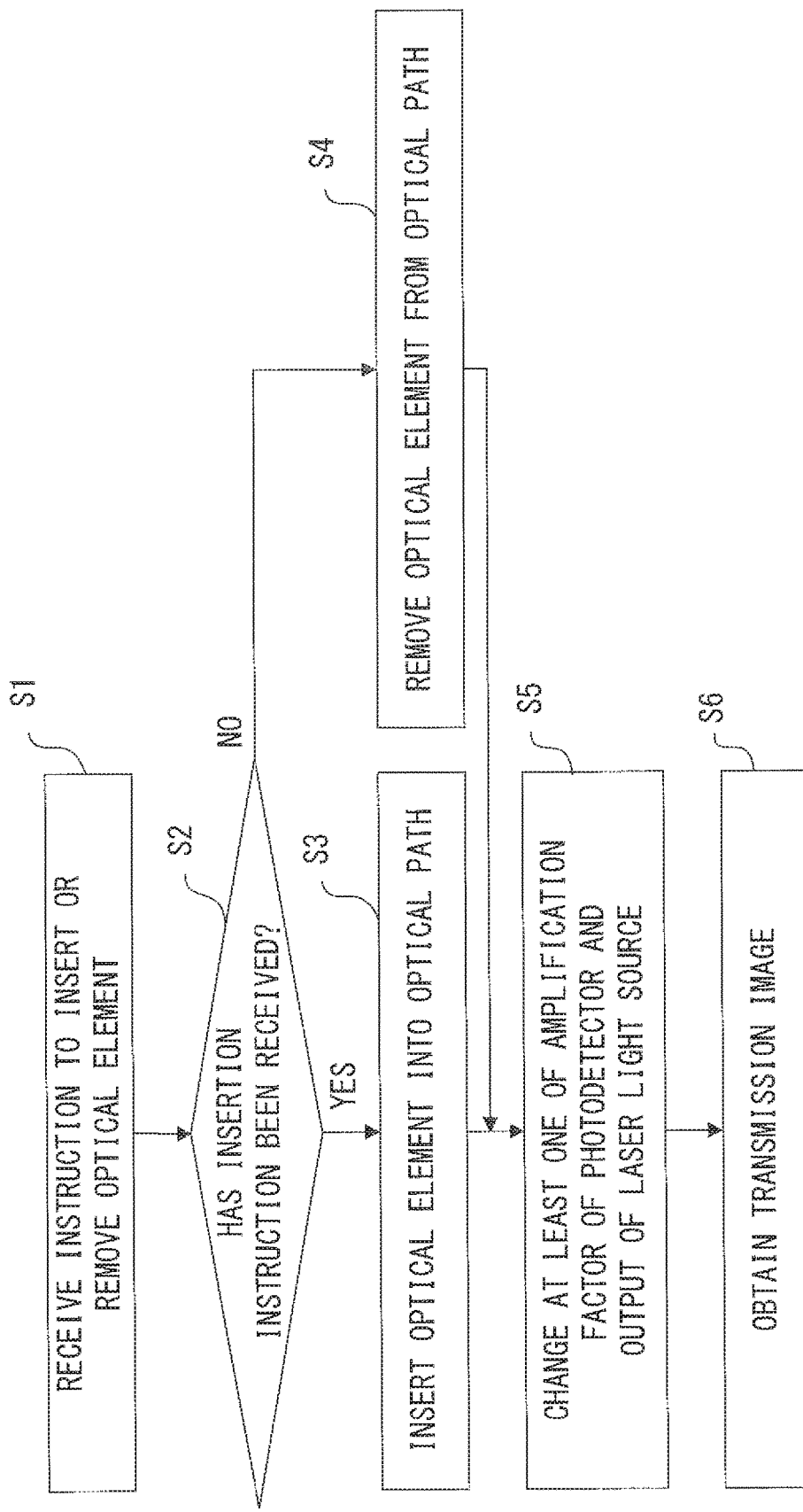
FIG. 5 is a flowchart illustrating the procedure of control processing according to the second embodiment.

FIG. 5 is a flowchart illustrating the procedure of control processing according to this embodiment. Control processing that is performed when the controller 14 executes a program is described below in detail with reference to FIG. 5.

First, when a user issues an instruction to insert or remove the optical element 8 by using a not-illustrated input device, the controller 14 receives the instruction to insert or remove the optical element 8 (step S1). When the controller 14 determines that the received instruction is an instruction to insert the optical element 8 into the optical path (step S2, YES), the controller 14 inserts the optical element 8 into the optical path (step S3). Here, the controller 14 controls the rotation of the turret 13 in such a way that the optical element 8 is located on the optical path. When the optical element 8 is already located on the optical path, step S3 and step S5 described later may be skipped.

When the controller 14 determines that the received instruction is an instruction to remove the optical element 8 from the optical path (step S2, NO), the controller 14 removes the optical element 8 from the optical path (step S4). Here, the controller 14 controls the rotation of the turret 13 in such a way that the optical element 8 is located outside the optical path. When the optical element 8 is already located outside the optical path, step S4 and step S5 described later may be skipped.

When the process of step S3 or step S4 is finished, the controller 14 changes at least one of the amplification factor of the photodetector 12 or the output of the laser 1 (step S5), and obtains a transmission image (step S6).

The process of step S5 is performed in order to prevent a situation in which the transmission image becomes excessively bright by removing the optical element 8 from the optical path and a situation in which the transmission image becomes excessively dark by inserting the optical element 8 into the optical path.

Specifically, when the optical element 8 is removed from the optical path, the controller 14 reduces the amplification factor of the photodetector 12 and/or reduces the output of the laser 1. When the optical element 8 is inserted into the optical path, the controller 14 increases the amplification factor of the photodetector 12 and/or increases the output of the laser 1. It is preferable that the controller 14 control and adjust at least one of the amplification factor of the photodetector 12 and the output of the laser 1 in such a way that the brightness of a transmission image obtained in a state in which the optical element 8 has been removed from the optical path is almost the same as the brightness of a transmission image obtained in a state in which the optical element 8 has been inserted into the optical path. Consequently, a specimen can be observed with an almost constant brightness regardless of observation magnification.

Further, assume a case in which a damage-susceptible biological specimen is a target to be observed. It is preferable that the controller 14 adjust the brightness of a transmission image while giving a higher priority to control of the amplification factor of the photodetector 12 than control of the output of the laser 1 within a range in which an influence of noise is not excessively caused. In particular, when a fluorescence image is obtained together with the transmission image, it is further preferable that a higher priority be given to control of the amplification factor of the photodetector 12 than control of the output of the laser 1 in order to suppress a change in the brightness of the fluorescence image.

Also by employing the laser scanning microscope 200, a transmission image can be obtained within a wide magnification range without switching detection lenses by inserting or removing the optical element 8 between the first surface LS1 and the image plane IP, similarly to the laser scanning microscope 100, and the transmission image can also be obtained without sacrificing a space in which a specimen is arranged. Further, in the laser scanning microscope 200, the brightness of the transmission image is automatically adjusted in accordance with insertion or removal of the optical element 8, and therefore a significant change in the brightness of an image can be suppressed.

Third Embodiment

Figure 6:
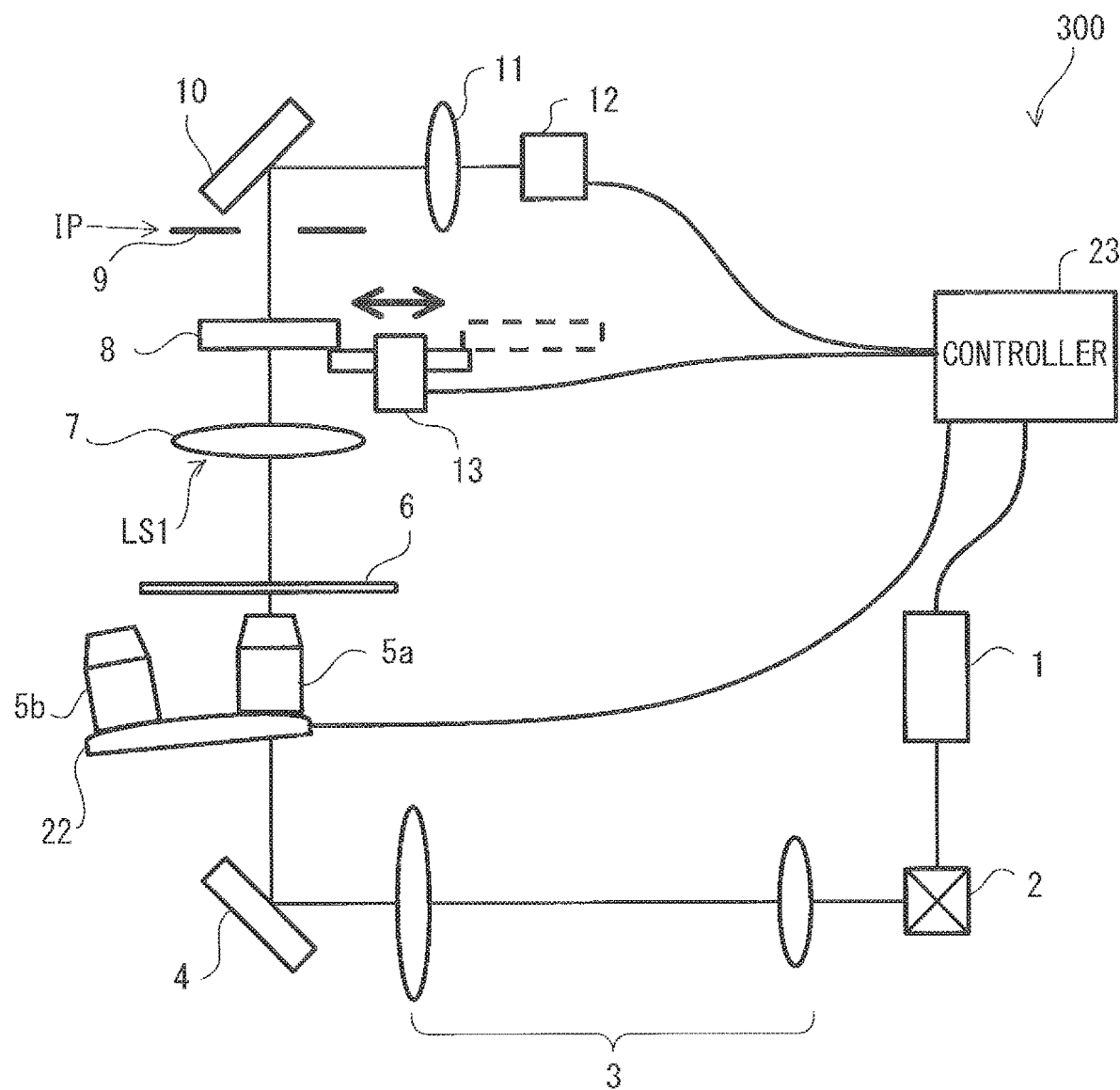
FIG. 6 illustrates the configuration of a laser scanning microscope 300 according to a third embodiment.

FIG. 6 illustrates the configuration of a laser scanning microscope 300 according to this embodiment. The laser scanning microscope 300 is different from the laser scanning microscope 200 in that the laser scanning microscope 300 includes a plurality of objectives (an objective 5a and an objective 5b) mounted on a revolver 22, instead of the objective 5, and that the laser scanning microscope 300 includes a controller 23 that is connected to the laser 1, the photodetector 12, the turret 13, and the revolver 22. In the other respects, the laser scanning microscope 300 is similar to the laser scanning microscope 200. The revolver 22 is an electric revolver that switches objectives to be used by being rotationally driven according to an instruction from the controller 23. The controller 23 is configured to control insertion or removal of the optical element 8 into/from the optical path in accordance with the magnification of an objective to be used and to control at least one of the amplification factor of the photodetector 12 and the output of the laser 1 in accordance with insertion or removal of the optical element 8 into/from the optical path.

Figure 7:
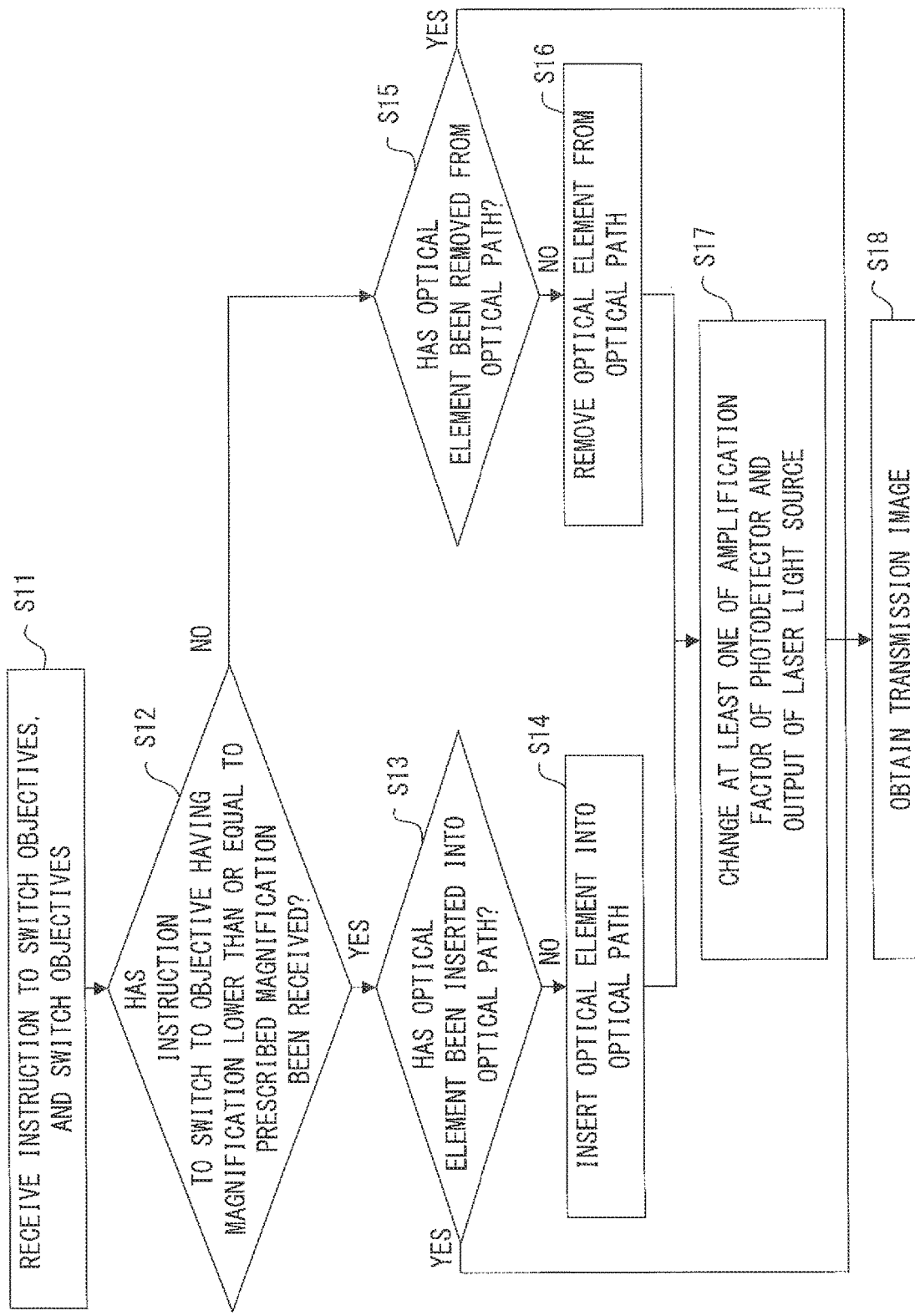
FIG. 7 is a flowchart illustrating the procedure of control processing according to the third embodiment.

FIG. 7 is a flowchart illustrating the procedure of control processing according to this embodiment. Control processing that is performed when the controller 23 executes a program is described below in detail with reference to FIG. 7.

First, when a user issues an instruction to switch objectives by using a not-illustrated input device, the controller 23 receives the instruction to switch objectives, and switches objectives in accordance with the instruction (step S11). Here, the controller 23 controls the rotation of the revolver 22 in such a way that an instructed objective is located on the optical path. Then, the controller 23 determines whether the received instruction is an instruction to switch to an objective having a magnification lower than or equal to a prescribed magnification (step S12).

When the controller 23 determines that the received instruction is an instruction to switch to an objective having a magnification lower than or equal to a prescribed magnification (step S12, YES), the controller 23 further determines whether the optical element 8 has been inserted into the optical path (step S13).

When the controller 23 determines that the optical element 8 has been inserted into the optical path (step S13, YES), the controller 23 obtains a transmission image (step S18). When the controller 23 determines that the optical element 8 has not been inserted into the optical path (step S13, NO), the controller 23 inserts the optical element 8 into the optical path (step S14), and further changes at least one of the amplification factor of the photodetector 12 and the output of the laser 1 (step S17). Then, the controller 23 obtains a transmission image (step S18). Note that step S14 and step S17 are similar to step S3 and step S5 in FIG. 5.

When the controller 23 determines that the received instruction is not an instruction to switch to an objective having a magnification lower than or equal to a prescribed magnification (step S12, NO), the controller 23 further determines whether the optical element 8 has been removed from the optical path (step S15).

When the controller 23 determines that the optical element 8 has been removed from the optical path (step S15, YES), the controller 23 obtains a transmission image (step S18). When the controller 23 determines that the optical element 8 has not been removed from the optical path (step S15, NO), the controller 23 removes the optical element 8 from the optical path (step S16), and further changes at least one of the amplification factor of the photodetector 12 and the output of the laser 1 (step S17). Then, the controller 23 obtains a transmission image (step S18). Note that step S16 and step S17 are similar to step S4 and step S5 in FIG. 5.

Also by employing the laser scanning microscope 300, a transmission image can be obtained within a wide magnification range without switching detection lenses by inserting or removing the optical element 8 between the first surface LS1 and the image plane IP, similarly to the laser scanning microscope 100. In addition, a transmission image can be obtained within a wide magnification range without sacrificing a space in which a specimen is arranged. Further, the brightness of an image is automatically adjusted in accordance with insertion or removal of the optical element 8, similarly to the laser scanning microscope 200, and therefore a significant change in the brightness of the transmission image can be suppressed. Furthermore, in the laser scanning microscope 300, the optical element 8 is automatically inserted or removed in accordance with an instruction to switch objectives. Accordingly, a user of a microscope can insert or remove the optical element 8 as needed by only performing a conventional operation, such as an operation to switch objectives, without being conscious of the optical element 8, and can obtain the effects above.

Fourth Embodiment

Figure 8:
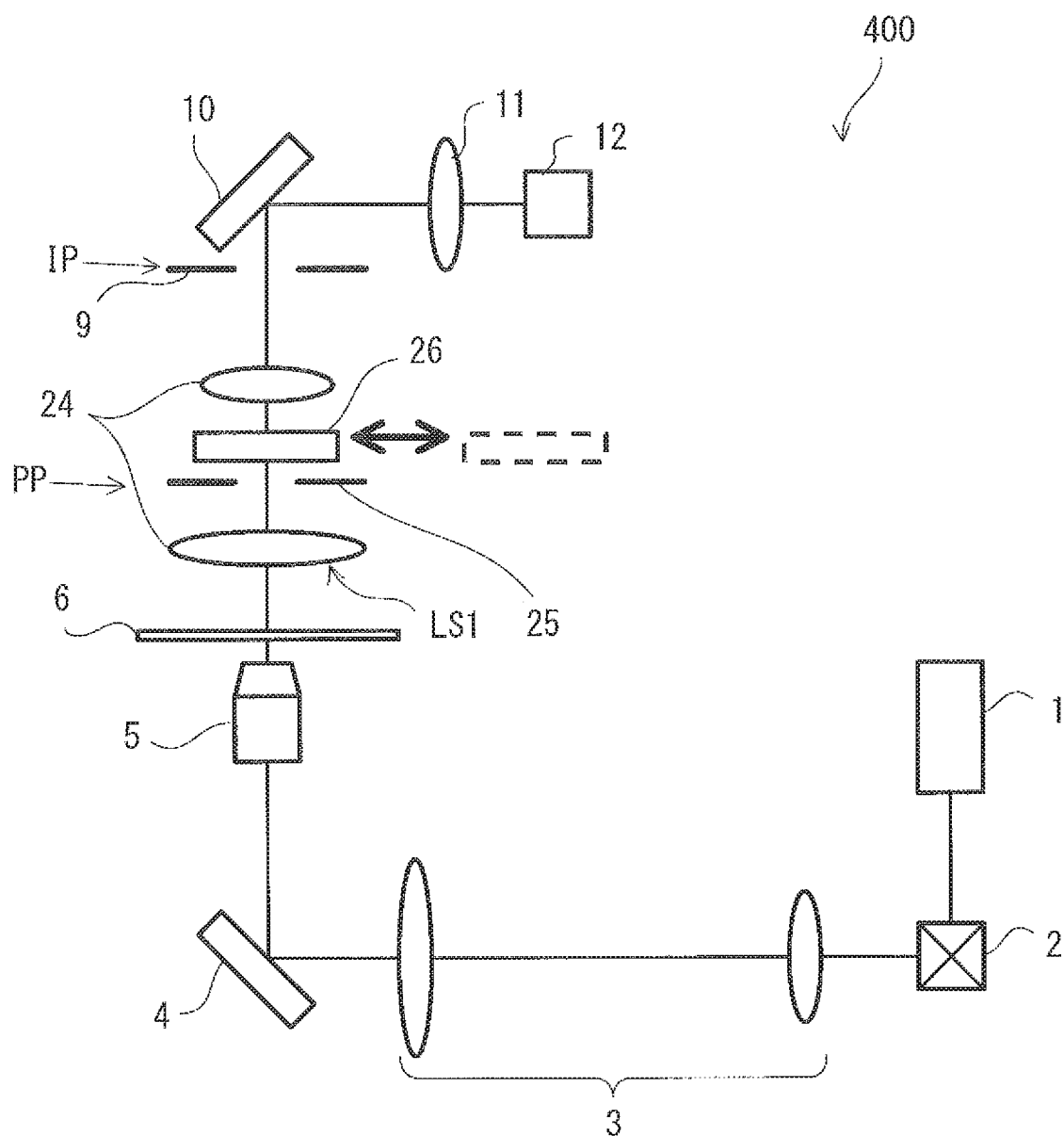
FIG. 8 illustrates the configuration of a laser scanning microscope 400 according to a fourth embodiment.
Figure 9:
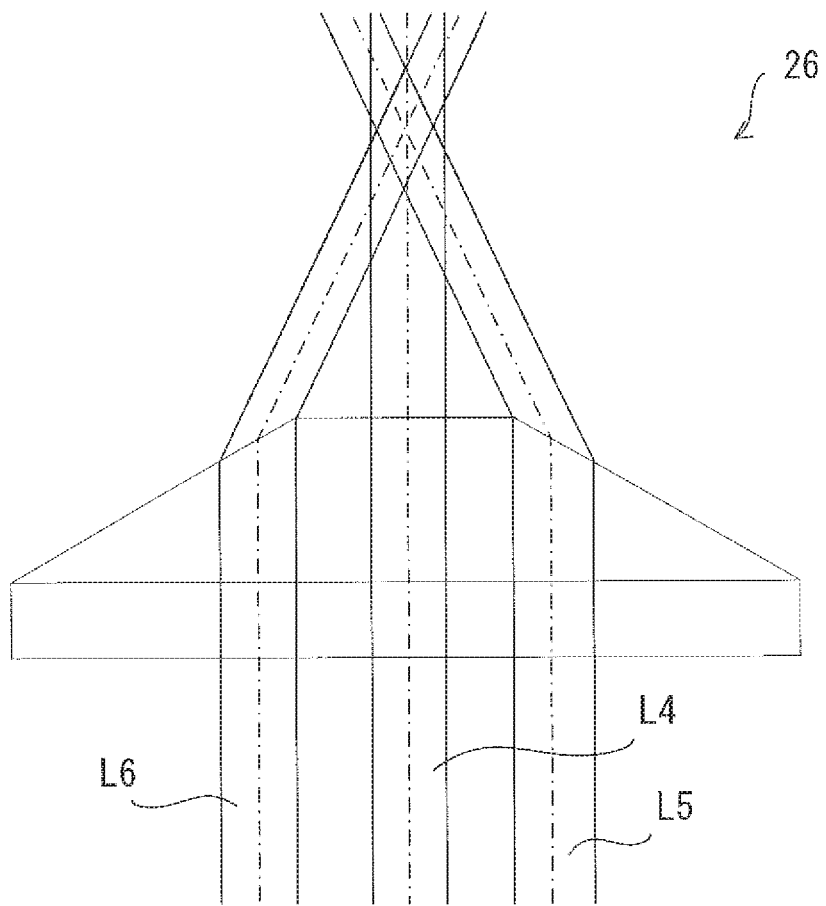
FIG. 9 is a diagram explaining an action of an optical element 26.

FIG. 8 illustrates the configuration of a laser scanning microscope 400 according to this embodiment. FIG. 9 is a diagram explaining an action of an optical element 26 included in the laser scanning microscope 400. The laser scanning microscope 400 is different from the laser scanning microscope 100 in that the laser scanning microscope 400 includes a detection lens 24 that is an optical system formed by a plurality of lenses, instead of the detection lens 7, in that the laser scanning microscope 400 includes an aperture stop 25 that is a light shielding member arranged between the detection lens 24 and the photodetector 12, and in that the laser scanning microscope 400 includes an optical element 26 instead of the optical element 8 that is a light diffusion element. In the other respects, the laser scanning microscope 400 is similar to the laser scanning microscope 100.

The aperture stop 25 is a diaphragm in which the size of an aperture is variable, and the aperture stop 25 is provided in or near an exit pupil position PP of the detection lens 24. The optical element 26 is a light deflection element that deflects a portion of a laser beam made incident on the optical element 26, and the optical element 26 is, for example, a lens chamfered near the top of an axicon lens, as illustrated in FIG. 9. The optical element 26 is configure to hardly deflect light L4 made incident on a chamfered surface, and to deflect light L5 and light L6 made incident in a position deviating somewhat from the center of the base of a cone.

In the laser scanning microscope 400, the optical element 26 is arranged in a position slightly away from the exit pupil position PP of the detection lens 24 in an optical-axis direction, namely, in a position different from the exit pupil position PP of the detection lens 24, in such a way that an optical axis of the detection lens 24 passes through the center of the base of the cone of the optical element 26. By arranging as described above, off-axis light in which vignetting is likely to be generated by the field stop 9, the relay optical system 11, or the like can be deflected, while suppressing deflection of on-axis light as much as possible. In the case of a configuration in which the pupil is relayed before the photodetector 12, the optical element 26 is arranged in a position that is also different from a position optically conjugate to the exit pupil position PP.

Also by employing the laser scanning microscope 400, a transmission image can be obtained within a wide magnification range without switching detection lenses, similarly to the laser scanning microscope 100. In addition, a transmission image can be obtained within a wide magnification range without sacrificing a space in which a specimen is arranged. Further, in the laser scanning microscope 400, the contrast of the transmission image can be adjusted by adjusting the size of an aperture of the aperture stop 25. Accordingly, as an example, even when a laser beam in an infrared wavelength region in which diffusion is not likely to be generated by a specimen because a wavelength is long is used, a satisfactory transmission image can be obtained by adjusting the aperture stop 25.

Figure 10:
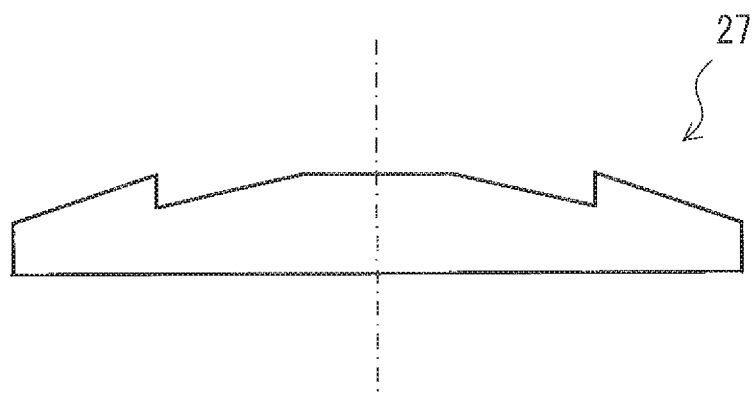
FIG. 10 illustrates an optical element 27.
Figure 11:
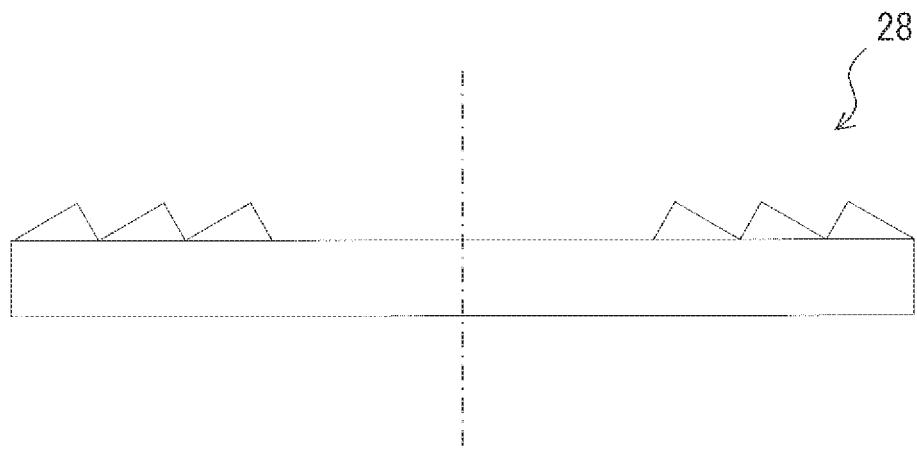
FIG. 11 illustrates an optical element 28.

In this embodiment, an example in which the laser scanning microscope 400 includes the optical element 26 has been described, but the laser scanning microscope 400 may include any light deflection element that deflects a portion of a laser beam. Accordingly, the laser scanning microscope 400 may include an optical element 27 illustrated in FIG. 10 or an optical element 28 illustrated in FIG. 11 instead of the optical element 26. The optical element 27 is configured by replacing a curved surface in the central portion of a Fresnel lens with a plane surface. The optical element 28 is a diffraction grating in which a concentric pattern is formed in a portion excluding a central portion. The laser scanning microscope 400 can exhibit the effects above even when the laser scanning microscope 400 includes the optical element 27 or the optical element 28 instead of the optical element 26.

Figure 13:
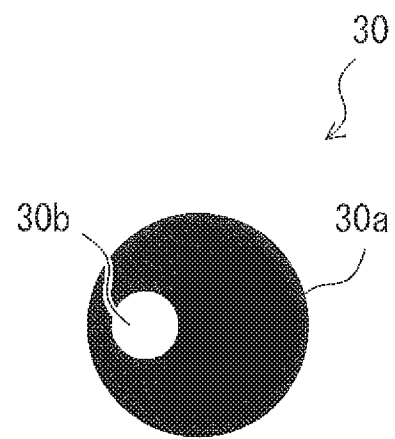
FIG. 13 illustrates a light shielding member 30.
Figure 14:
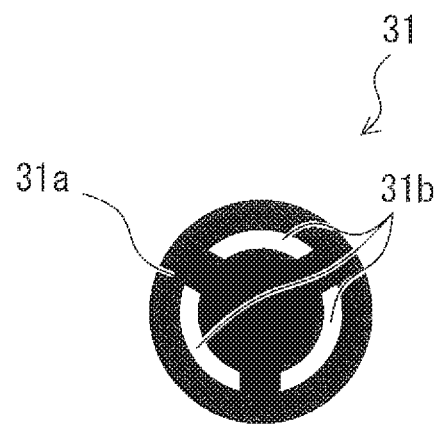
FIG. 14 illustrates a light shielding member 31.

In this embodiment, an example in which the laser scanning microscope 400 includes the aperture stop 25 has been described, but the laser scanning microscope 400 may include any light shielding member that includes an aperture and partially shields an incident light flux between the detection lens 24 and the photodetector 12. Therefore, the laser scanning microscope 400 may include a light shielding member 29 illustrated in FIG. 12, a light shielding member 30 illustrated in FIG. 13, or a light shielding member 31 illustrated in FIG. 14, instead of the aperture stop 25, in or near the exit pupil position PP. The light shielding member 29 is a diaphragm for oblique illumination that includes a light shielding unit 29a and an aperture 29b. The light shielding member 30 is a diaphragm that includes an eccentric aperture, and the light shielding member 30 includes a light shielding unit 30a and an aperture 30b that is formed in a position eccentric from the optical axis. The light shielding member 31 includes a light shielding unit 31a and an aperture 31b that is a ring-shaped slit. The laser scanning microscope 400 can exhibit the effects above even when the laser scanning microscope 400 includes the light shielding member 29, the light shielding member 30, or the light shielding member 31 instead of the aperture stop 25.

In addition, when the laser scanning microscope 400 includes a turret near the exit pupil position PP, the optical element 26 may be mounted on the turret provided near the exit pupil position PP, and may be inserted or removed into/from the optical path.

Further, an example has been described in which an optical element that is removably arranged between the image plane IP and the first surface SL1 deflects a portion of a laser beam, but the optical element that is removably arranged may be alight diffusion element that converts a laser beam into diffused light, such as a light diffusion plate or a fluorescent plate. Furthermore, the light diffusion element may be configured so as to be integrated with the light shielding member above (the aperture stop 25, the light shielding member 29, the light shielding member 30, or the light shielding member 31). Namely, a new member that is formed of the light diffusion element and the light shielding member above may function as a light shielding member that includes an aperture that is configured by the light diffusion element. In this case, it is preferable that the new member be removably arranged between the image plane IP and the first surface LS1.

Fifth Embodiment

Figure 15:
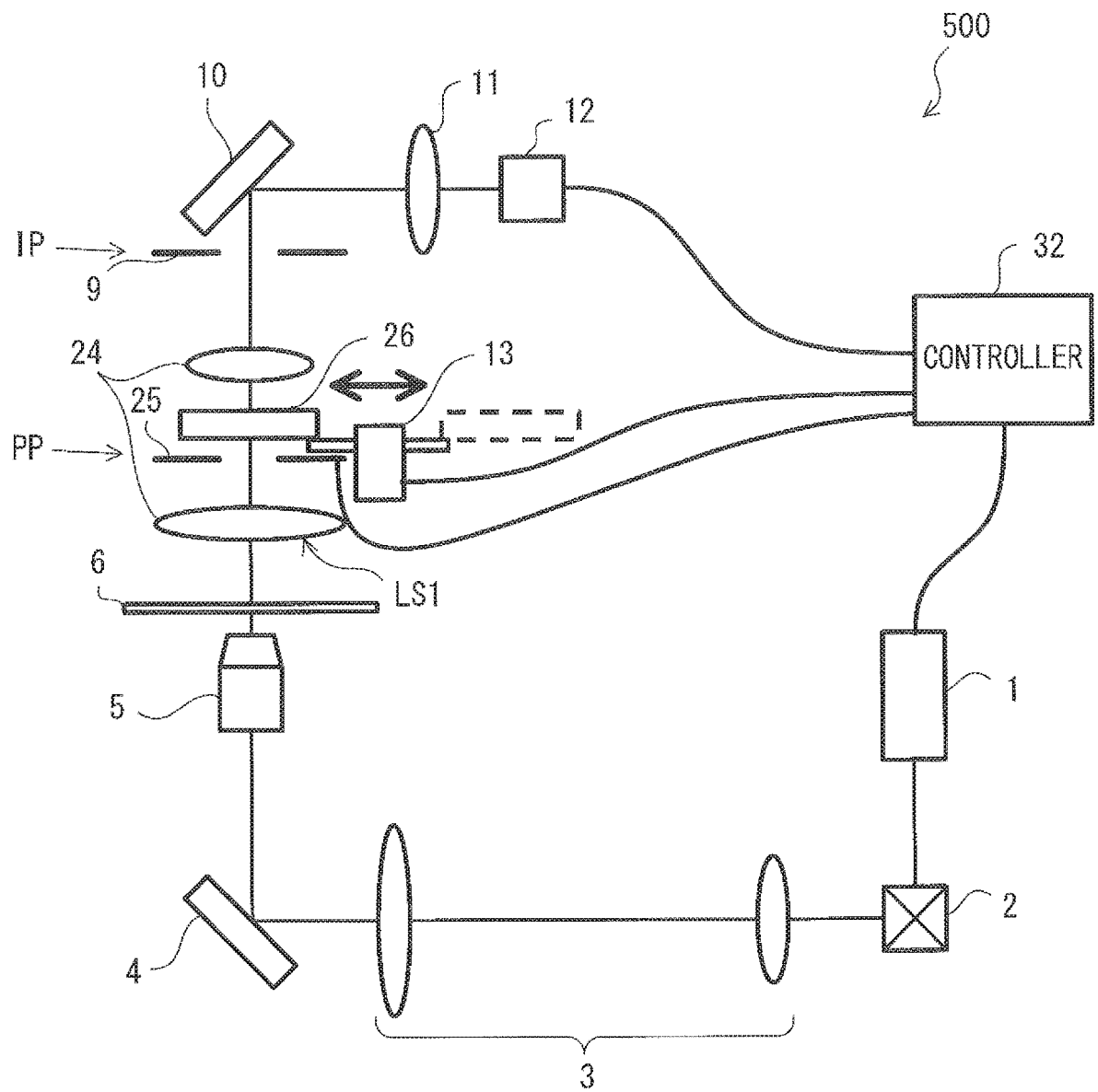
FIG. 15 illustrates the configuration of a laser scanning microscope 500 according to a fifth embodiment.

FIG. 15 illustrates the configuration of a laser scanning microscope 500 according to this embodiment. The laser scanning microscope 500 is different from the laser scanning microscope 400 in that the laser scanning microscope 500 includes a turret 13 that inserts or removes the optical element 26 into/from the optical path and a controller 32 that is connected to the laser 1, the photodetector 12, the turret 13, and the aperture stop 25. In the other respects, the laser scanning microscope 500 is similar to the laser scanning microscope 400. The turret 13 is an electric turret that is rotationally driven according to an instruction from the controller 32. The controller 32 is configured to control at least one of the amplification factor of the photodetector 12 or the output of the laser 1 in accordance with insertion or removal of the optical element 26 into/from the optical path. The controller 32 is further configured to control the size of the aperture of the aperture stop 25 in accordance with the contrast of a scanning image (a transmission image) of a specimen that is generated according to an output from the photodetector 12.

Figure 16:
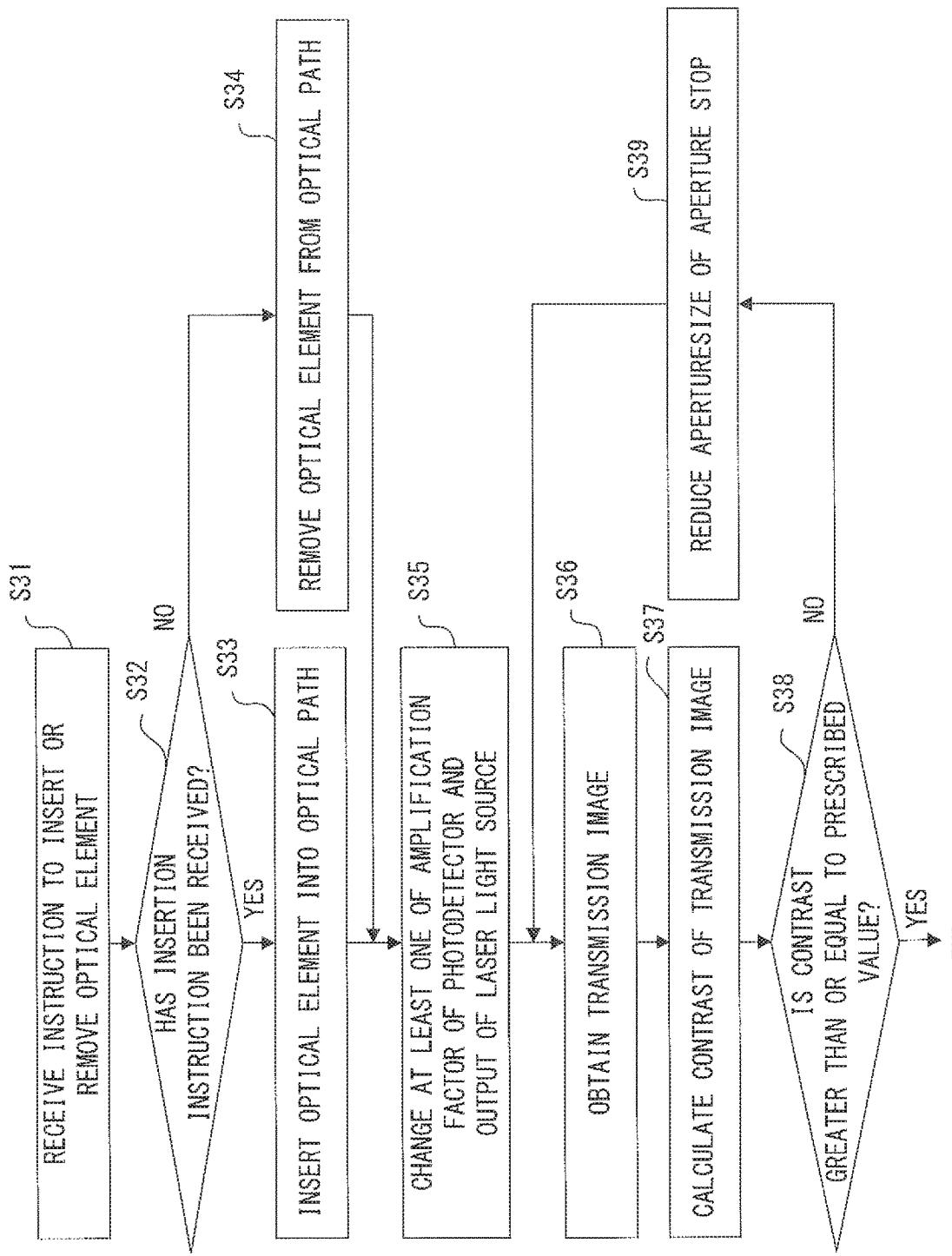
FIG. 16 is a flowchart illustrating the procedure of control processing according to the fifth embodiment.

FIG. 16 is a flowchart illustrating the procedure of control processing according to this embodiment. Control processing that is performed when the controller 32 executes a program is described below in detail with reference to FIG. 16.

Step S31 to step S36 are similar to step S1 to step S6 in FIG. 5. When a transmission image is obtained in step S36, the controller 32 calculates the contrast of the transmission image (step S37). The contrast is calculated by using an arbitrary known method.

Then, the controller 32 determines whether the calculated contrast of the transmission image is greater than or equal to a prescribed value (step S38). When the controller 32 determines that the contrast is smaller than the prescribed value, the controller 32 reduces the aperture size of the aperture stop 25 (step S39), and the processing returns to step S36. In step S39, the controller 32 controls the aperture stop 25 in such a way that the size of the aperture of the aperture stop 25 is reduced.

Step S36 to step S39 are repeated until the contrast of the transmission image becomes greater than or equal to the prescribed value, and the control processing is terminated when the contrast becomes greater than or equal to the prescribed value.

Also by employing the laser scanning microscope 500, a transmission image can be obtained within a wide magnification range without switching detection lenses, and the transmission image can be obtained within a wide magnification range without sacrificing a space in which a specimen is arranged, similarly to the laser scanning microscope 100. In addition, in the laser scanning microscope 500, the brightness of an image is automatically adjusted in accordance with insertion or removal of the optical element 26, similarly to the laser scanning microscope 200, and therefore a significant change in the brightness of the transmission image can be suppressed. Further, in the laser scanning microscope 500, the contrast of the transmission image can be adjusted by adjusting the size of the aperture of the aperture stop 25. Therefore, as an example, even when a laser beam in an infrared wavelength region in which a wavelength is long and diffusion is not likely to be generated by a specimen is used, a satisfactory transmission image can be obtained by adjusting the aperture stop 25. Furthermore, in the laser scanning microscope 500, the aperture stop 25 is automatically controlled according to the contrast of the obtained transmission image, and therefore a user of a microscope can easily obtain a high-contrast image.

Sixth Embodiment

FIG. 17 illustrates the configuration of a laser scanning microscope 600 according to this embodiment. The laser scanning microscope 600 is different from the laser scanning microscope 500 in that the laser scanning microscope 600 includes a light shielding member 29 for oblique illumination instead of the aperture stop 25 and that the laser scanning microscope 600 includes a controller 33 that is connected to the laser 1, the photodetector 12, the turret 13, and the light shielding member 29, instead of the controller 32. In the other respects, the laser scanning microscope 600 is similar to the laser scanning microscope 500. The controller 33 is configured to control at least one of the amplification factor of the photodetector 12 and the output of the laser 1 in accordance with insertion or removal of the optical element 26 into/from the optical path. In addition, the controller 33 is configured to control the rotation of the light shielding member 29 in such a way that the position of the aperture moves. Further, the controller 33 also functions as an image processing device. Specifically, the controller 33 generates a new image of a specimen from a plurality of scanning images (transmission images) that are obtained in respective states in which the positions of the aperture of the light shielding member 29 are different from each other.

Figure 18:
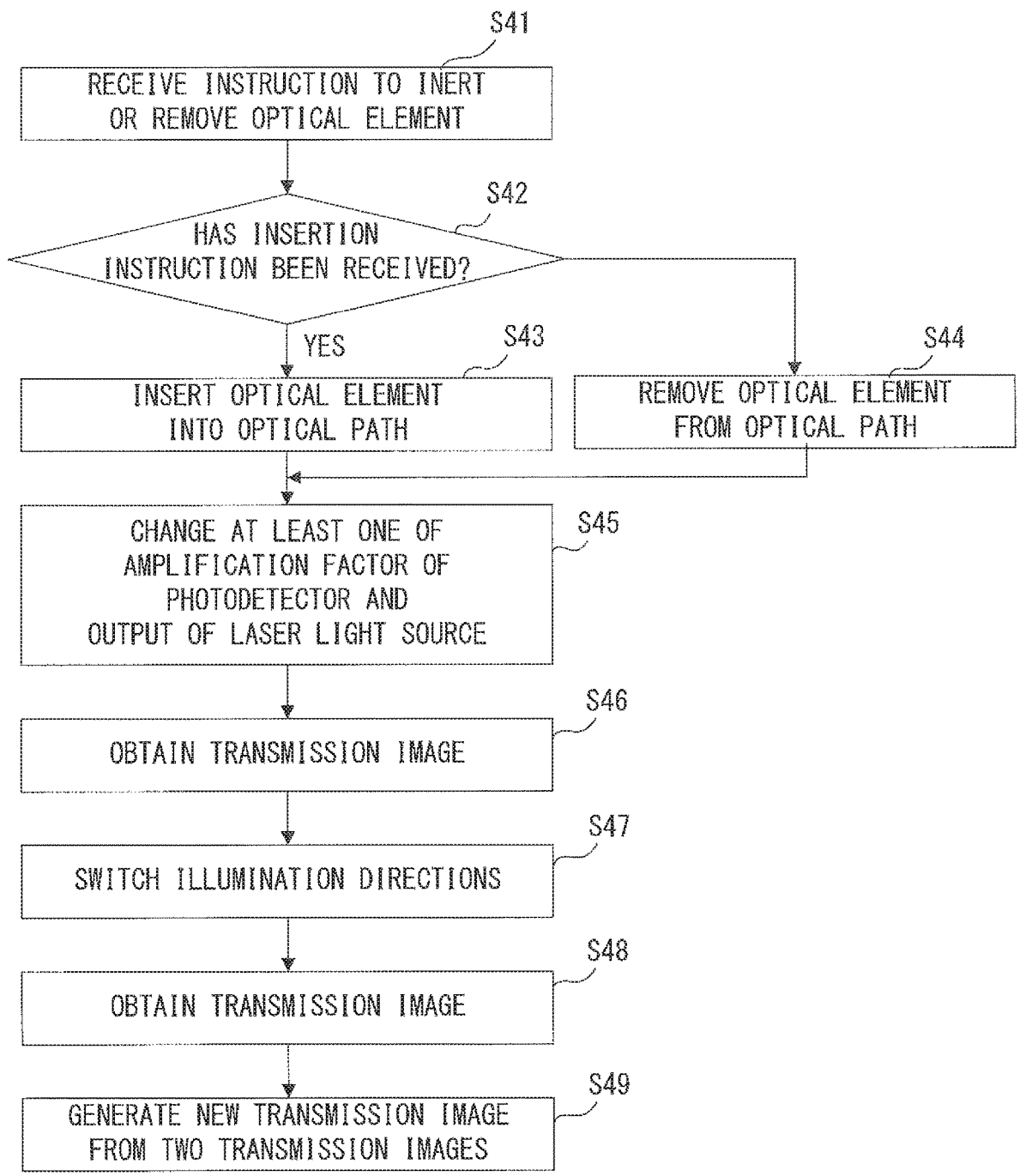
FIG. 18 is a flowchart illustrating the procedure of control processing according to the sixth embodiment.

FIG. 18 is a flowchart illustrating the procedure of control processing according to this embodiment. Control processing that is performed when the controller 33 executes a program is described below in detail with reference to FIG. 18.

Figure 12:
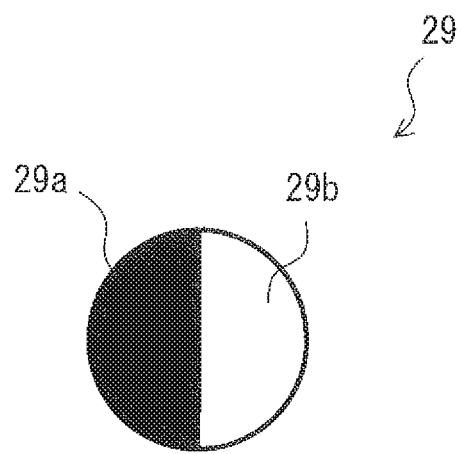
FIG. 12 illustrates a light shielding member 29.
Figure 19:
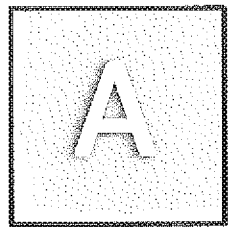
FIG. 19 illustrates an image 34 of a specimen to which oblique illumination is applied.

Step S41 to step S46 are similar to step S1 to step S6 in FIG. 5. FIG. 19 illustrates a transmission image 34 obtained in step S46. The transmission image 34 includes a shadow on a left-hand side of a structure in the image. This is because the light shielding member 29 is arranged as illustrated in FIG. 12 in an initial state and light enters a specimen from a right-hand side.

Figure 20:
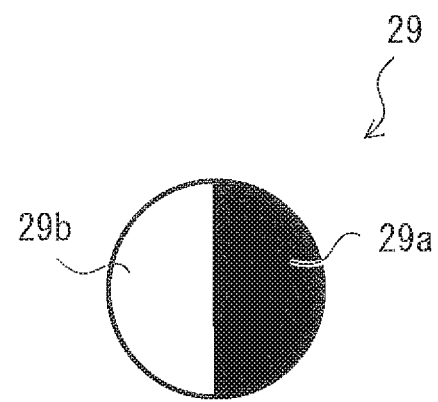
FIG. 20 illustrates the light shielding member 29, and illustrates a situation in which the position of an opening 29a has been changed from the position in FIG. 12.

When a transmission image is obtained in step S46, the controller 33 switches illumination directions (step S47). Here, the controller 33 performs control such that the light shielding member 29 rotates by 180 degrees, and such that the position of the aperture 29b before rotation is symmetrical to the position after rotation with respect to the optical axis. FIG. 20 illustrates the light shielding member 29 after rotation.

Figure 21:
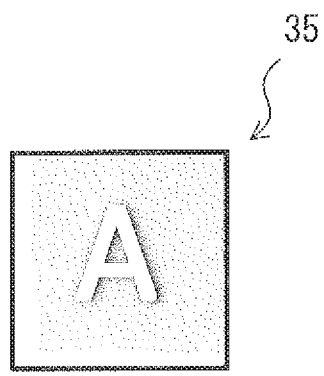
FIG. 21 illustrates another image 35 of the specimen to which oblique illumination is applied.

Then, the controller 33 obtains a transmission image again (step S48). FIG. 21 illustrates a transmission image 35 obtained in step S48. The transmission image 35 includes a shadow on a right-hand side of a structure in the image, unlike the transmission image 34. This is because the light shielding member 29 is arranged as illustrated in FIG. 20 and light enters a specimen from a left-hand side.

Finally, the controller 33 generates a new transmission image of the specimen from a plurality of scanning images obtained in respective states in which the positions of the aperture 29b are different from each other (step S49). Here, as an example, an arithmetic process, such as a process for calculating a difference between two images, is performed, and an image in which a contrast is emphasized is generated. FIG. 22 illustrates an image 36 generated in step S49.

Also, by employing the laser scanning microscope 600, a transmission image can be obtained within a wide magnification range without switching detection lenses, and the transmission range can be obtained with a wide magnification range without sacrificing a space in which a specimen is arranged, similarly to the laser scanning microscope 100. In addition, in the laser scanning microscope 600, the brightness of an image is automatically adjusted in accordance with insertion or removal of the optical element 26, similarly to the laser scanning microscope 200, and therefore a significant change in the brightness of the transmission image can be suppressed. Further, in the laser scanning microscope 600, an image in which a contrast is emphasized can be obtained by performing image processing.

In this embodiment, an example in which the laser scanning microscope 600 includes the light shielding member 29 has been described, but the laser scanning microscope 600 may include a light shielding member 37 illustrated in FIG. 23A to FIG. 23C that includes a light shielding unit 37a and an aperture 37b, instead of the light shielding member 29. In this case, the controller 33 may rotate the light shielding member 37 by 120 degrees at a time, as illustrated in FIG. 23A to FIG. 23C, may obtain a transmission image in each state, and may generate a new transmission image in which contrast is emphasized from the three obtained transmission images.

Seventh Embodiment

Figure 24:
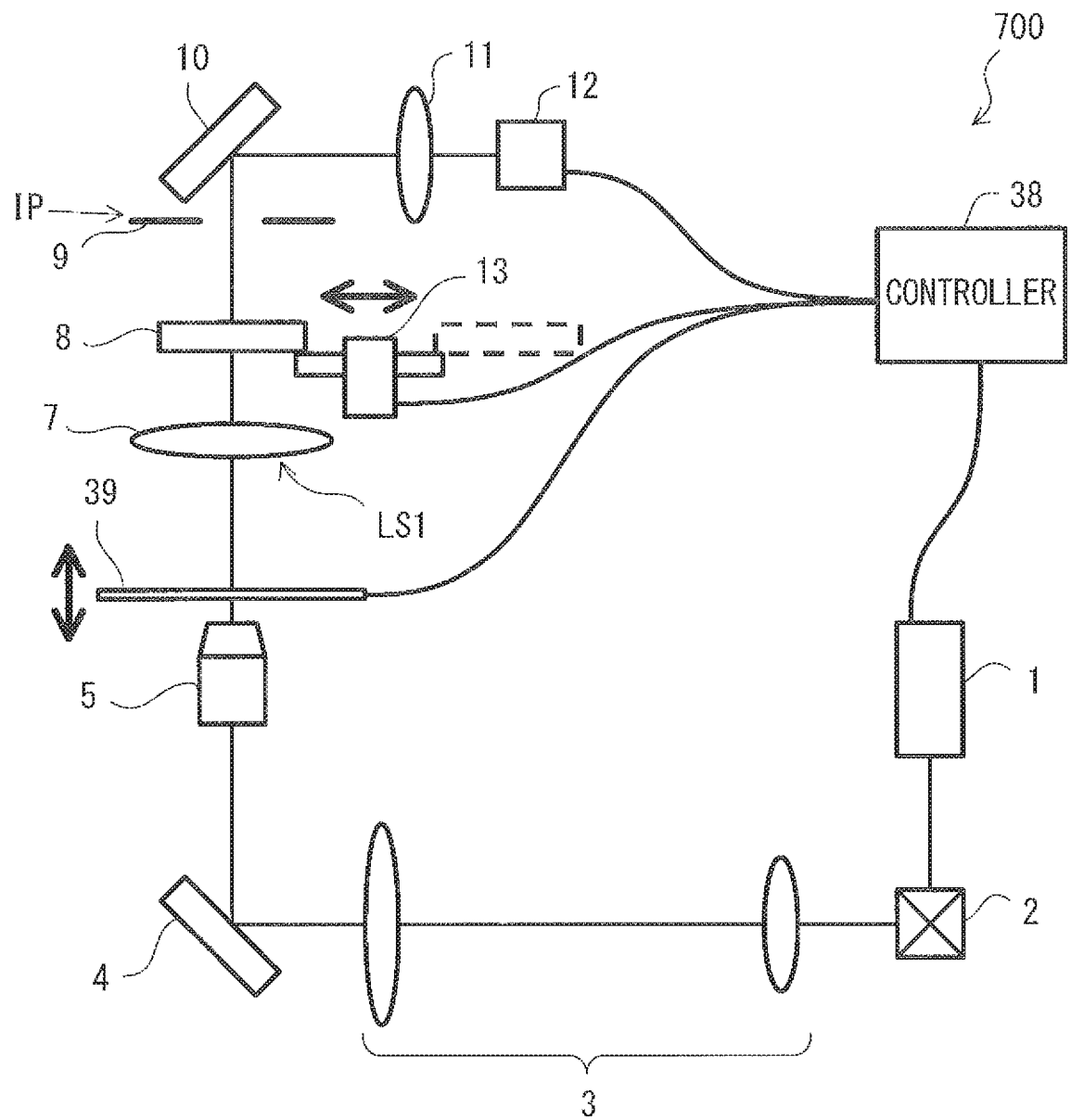
FIG. 24 illustrates the configuration of a laser scanning microscope 700 according to a seventh embodiment.

FIG. 24 illustrates the configuration of a laser scanning microscope 700 according to this embodiment. The laser scanning microscope 700 is different from the laser scanning microscope 200 in that the laser scanning microscope 700 includes a stage 39 instead of the stage 6 and that the laser scanning microscope 700 includes a controller 38 that is connected to the laser 1, the photodetector 12, the turret 13, and the stage 39, instead of the controller 14. In the other respects, the laser scanning microscope 700 is similar to the laser scanning microscope 200. The stage 39 is an electric stage that moves at least in the optical-axis direction of the objective 5 in accordance with an instruction from the controller 38. The controller 38 is configured to control at least one of the amplification factor of the photodetector 12 and the output of the laser 1 in accordance with insertion or removal of the optical element 8 into/from the optical path. In addition, the controller 38 controls the movement of the stage 39 in the optical-axis direction in such a way that a focal position of the detection lens 7 moves to the front or rear of the stage 39. Further, the controller 38 also functions as an image processing device. Specifically, a new transmission image of a specimen is generated from a plurality of scanning images (transmission images) that are respectively obtained in a state in which the focal position of the detection lens 7 is located on a front side of the stage 39 (namely, a front-focus state) and a state in which the focal position of the detection lens 7 is located on a rear side of the stage 39 (namely, a rear-focus state).

Figure 25:
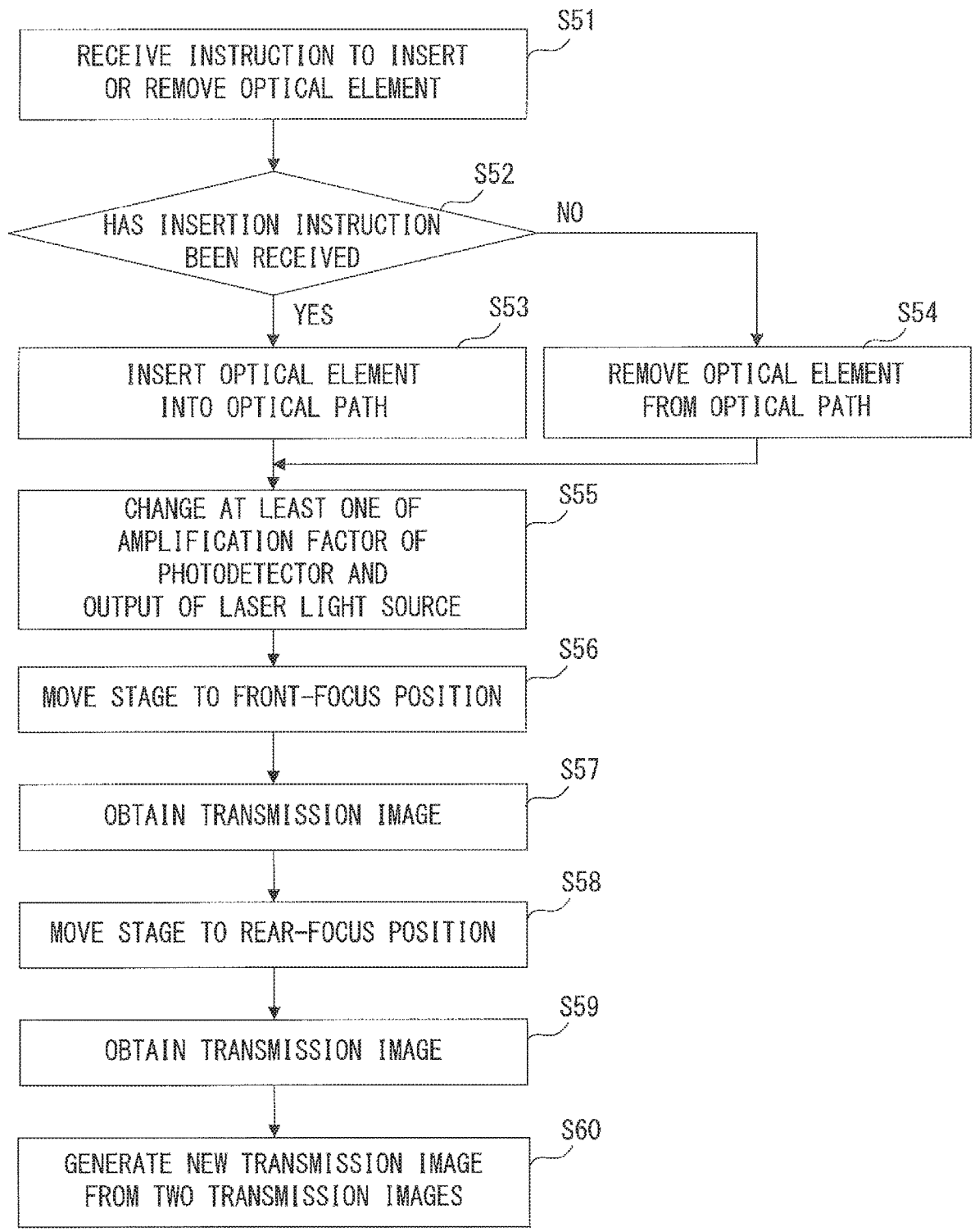
FIG. 25 is a flowchart illustrating the procedure of control processing according to the seventh embodiment.

FIG. 25 is a flowchart illustrating the procedure of control processing according to this embodiment. Control processing that is performed when the controller 38 executes a program is described below in detail with reference to FIG. 25.

Step S51 to step S55 are similar to step S1 to step S5 in FIG. 5. When at least one of an amplification factor of a photodetector or an output of a laser light source is changed in step S55, the controller 38 moves the stage 39 in a front-focus position (step S56), and obtains a transmission image in the front-focus state (step S57). Then, the controller 38 moves the stage 39 in a rear-focus position (step S58), and obtains a transmission image in the rear-focus state (step S59).

Finally, the controller 38 generates a new image of a specimen in which contrast is emphasized from the two transmission images obtained in the front-focus state and the rear-focus state (step S60), and terminates the control processing.

Also by employing the laser scanning microscope 700, a transmission image can be obtained within a wide magnification range without switching detection lenses, and the transmission image can be obtained within a wide magnification range without sacrificing a space in which a specimen is arranged, similarly to the laser scanning microscope 100. In addition, in the laser scanning microscope 700, the brightness of an image is automatically adjusted according to insertion or removal of the optical element 8, similarly to the laser scanning microscope 200, and therefore a significant change in the brightness of the transmission image can be suppressed. Further, in the laser scanning microscope 700, an image in which contrast is emphasized can be obtained by performing image processing, similarly to the laser scanning microscope 600.

The embodiments described above give specific examples in order to make the invention easily understandable, and the embodiments of the present invention are not limited to the embodiments above. Various modifications or variations to a laser scanning microscope, and a control method and a program thereof can be made without departing from the scope of the invention specified in the claims.

What is claimed is:

1. A laser scanning microscope comprising:
   a laser light source that emits a laser beam;
   an objective that irradiates a specimen with the laser beam;
   a detection lens that condenses the laser beam that passes through the specimen, the detection lens being arranged so as to face the objective with the specimen interposed between the detection lens and the objective;
   a light diffusion element that is removably arranged between an image plane on which the detection lens forms an image of the specimen and a first surface that is a lens surface of the detection lens closest to the specimen, the light diffusion element converting the laser beam made incident on the light diffusion element into diffused light;
   a photodetector that detects detection light emitted from the detection lens to the image plane; and a controller that controls at least one of (i) an amplification factor of the photodetector so that the amplification factor of the photodetector increases when the light diffusion element is inserted into an optical path and decreases when the light diffusion element is removed from the optical path, and (ii) an output of the laser light source so that the output of the laser light source increases when the light diffusion element is inserted into the optical path and decreases when the light diffusion element is removed from the optical path, wherein the objective is one of a plurality of objectives that are switchable, and wherein the controller controls insertion of the light diffusion element into the optical path when the objective is switched to an objective having a magnification lower than 10 times, and controls removal of the light diffusion element when the objective is switched to an objective having a magnification equal to or higher than 10 times.

2. The laser scanning microscope according to claim 1, further comprising:

a light shielding member that is arranged between the detection lens and the photodetector, the light shielding member including an aperture, and partially shielding an incident light flux.

3. The laser scanning microscope according to claim 1, wherein the controller generates a new image of the specimen from a plurality of scanning images including a first scanning image of the specimen that is generated according to the output from the photodetector in a state in which a focal plane of the detection lens is located closer to the detection lens than a specimen surface is and a second scanning image of the specimen that is generated according to the output from the photodetector in a state in which the focal plane of the detection lens is located closer to the objective than the specimen surface is.

4. The laser scanning microscope according to claim 1, further comprising:

a scanner that scans the specimen with the laser beam.

5. The laser scanning microscope according to claim 1, further comprising:

a relay optical system that is arranged between the light diffusion element arranged between the image plane and the first surface, and the photodetector.

6. A control method of a laser scanning microscope having a plurality of objectives that are switchable, the method comprising:

controlling insertion and removal of a light diffusion element between an image plane on which a detection lens forms an image of a specimen irradiated with a laser beam and a first surface that is a lens surface of the detection lens closest to the specimen so that the light diffusion element is (i) inserted into an optical path when switching to an objective having a magnification lower than 10 times, and (ii) removed from the optical path when switching to an objective having a magnification equal to or higher than 10 times, the light diffusion element converting the laser beam into diffused light, and the detection lens being arranged so as to face the objective with the specimen interposed between the detection lens and the objective; and controlling at least one of (i) an amplification factor of a photodetector so that the amplification factor of the photodetector increases when the light diffusion element is inserted into the optical path and decreases when the light diffusion element is removed from the optical path, and (ii) an output of a laser light source so that the output of the laser light source increases when the light diffusion element is inserted into the optical path and decreases when the light diffusion element is removed from the optical path, the photodetector detecting detection light emitted from the detection lens to the image plane, and the laser light source emitting the laser beam.

* * * * *